US012608397B2

(12) United States Patent
Glueck et al.

(10) Patent No.: US 12,608,397 B2
(45) Date of Patent: Apr. 21, 2026

(54) HANDOFF SUPPORT IN ASYNCHRONOUS ANALYSIS TASKS USING KNOWLEDGE TRANSFER GRAPHS

(71) Applicant: AUTODESK, INC., San Francisco, CA (US)

(72) Inventors: Michael Glueck, Toronto (CA); Azam Khan, Toronto (CA); Jian Zhao, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 15/710,776

(22) Filed: Sep. 20, 2017

(65) Prior Publication Data

US 2018/0081885 A1 Mar. 22, 2018

Related U.S. Application Data

(63) Continuation-in-part of application No. 15/441,219, filed on Feb. 23, 2017, now Pat. No. 11,663,235.

(60) Provisional application No. 62/557,112, filed on Sep. 11, 2017, provisional application No. 62/398,433, filed on Sep. 22, 2016.

(51) Int. Cl.
| | |
|---|---|
| *G06F 16/26* | (2019.01) |
| *G06F 16/2457* | (2019.01) |
| *G06F 40/169* | (2020.01) |
| *G06Q 10/10* | (2023.01) |

(52) U.S. Cl.
CPC ........ *G06F 16/26* (2019.01); *G06F 16/24573* (2019.01); *G06F 40/169* (2020.01); *G06Q 10/103* (2013.01)

(58) Field of Classification Search
CPC .. G06F 17/241; G06F 17/30525; G06F 16/26; G06F 16/24573; G06F 40/169; G06Q 10/101; G06Q 10/103
See application file for complete search history.

(56) References Cited

U.S. PATENT DOCUMENTS

| | | | | | |
|---|---|---|---|---|---|
| 5,786,814 | A | * | 7/1998 | Moran | .............. G06F 17/30831 |
| | | | | | 348/E7.081 |
| 7,630,867 | B2 | * | 12/2009 | Behrens | ................. G06Q 10/10 |
| | | | | | 703/2 |

(Continued)

OTHER PUBLICATIONS

Vocabulary.com, "Timeline—Dictionary Definition," 2014, www. vocabulary.com, https://web.archive.org/web/20140428034119/ https://www.vocabulary.com/dictionary/timeline, pp. 1-2. (Year: 2014).*

(Continued)

*Primary Examiner* — Tamara T Kyle
*Assistant Examiner* — Tyler Schallhorn
(74) *Attorney, Agent, or Firm* — Artegis Law Group, LLP

(57) ABSTRACT

One embodiment of the present application sets forth a method for playback of a sense-making operation. The method includes receiving first session data that includes a set of timeline steps. Each timeline step included in the set of timeline steps corresponds to a user action performed on a data set. The method further includes receiving a playback command to display a first sequence of timeline steps included in the set of timeline steps. The method further includes rendering a first graph for display based on at least one timeline step included in the first sequence of timeline steps.

23 Claims, 8 Drawing Sheets

(56) References Cited

U.S. PATENT DOCUMENTS

| | | | | |
|---|---|---|---|---|
| 7,668,787 B2* | 2/2010 | Bier | G06F 16/34 | 707/766 |
| 8,001,157 B2* | 8/2011 | Bier | G06F 16/34 | 704/9 |
| 8,010,646 B2* | 8/2011 | Bier | G06F 16/93 | 715/862 |
| 8,285,668 B2* | 10/2012 | Kaiser | G06N 5/02 | 706/50 |
| 8,458,595 B1* | 6/2013 | Margulis | G11B 27/34 | 715/838 |
| 8,533,593 B2* | 9/2013 | Grossman | G11B 27/34 | 715/704 |
| 8,667,385 B1* | 3/2014 | Mui | G06F 16/904 | 715/205 |
| 8,701,002 B2* | 4/2014 | Grossman | G06F 40/197 | 715/704 |
| 9,146,657 B2* | 9/2015 | Beckett | G06F 3/0484 | |
| 9,183,281 B2* | 11/2015 | Cheng | G06F 16/335 | |
| 9,727,544 B2* | 8/2017 | Hunter | G06F 40/166 | |
| 9,786,074 B2* | 10/2017 | Beckett | G06F 3/0484 | |
| 9,836,183 B1 | 12/2017 | Live et al. | | |
| 10,055,486 B1 | 8/2018 | Xu et al. | | |
| 10,061,756 B2* | 8/2018 | Gunawardena | G06F 40/169 | |
| 10,204,093 B2* | 2/2019 | Miller | G06F 16/24544 | |
| 10,417,515 B2* | 9/2019 | Scott | G06V 30/40 | |
| 10,565,225 B2* | 2/2020 | Ross | G06F 3/0482 | |
| 10,635,854 B2* | 4/2020 | Hosokawa | G06F 40/295 | |
| 11,017,162 B2* | 5/2021 | Ono | G06F 40/106 | |
| 11,663,235 B2* | 5/2023 | Zhao | G06F 16/358 | 715/232 |
| 11,669,748 B2* | 6/2023 | Lebow | G06N 5/02 | 706/11 |
| 2003/0225926 A1* | 12/2003 | Nosek | G06Q 10/10 | 719/317 |
| 2004/0090472 A1 | 5/2004 | Risch et al. | | |
| 2004/0103091 A1 | 5/2004 | Lindblad et al. | | |
| 2004/0267798 A1* | 12/2004 | Chatterjee | G06F 40/169 | 707/999.102 |
| 2006/0047697 A1 | 3/2006 | Conway et al. | | |
| 2006/0236219 A1* | 10/2006 | Grigorovitch | G11B 27/034 | 715/203 |
| 2007/0239405 A1* | 10/2007 | Behrens | G06Q 10/10 | 703/2 |
| 2007/0299547 A1* | 12/2007 | Bier | G06N 5/025 | 707/E17.093 |
| 2007/0299872 A1* | 12/2007 | Bier | G06F 16/34 | 707/E17.093 |
| 2007/0300190 A1* | 12/2007 | Bier | G06F 40/295 | 707/E17.084 |
| 2009/0265330 A1* | 10/2009 | Cheng | G06F 16/335 | 707/999.005 |
| 2009/0287630 A1* | 11/2009 | Kaiser | G06N 5/02 | 706/50 |
| 2011/0218820 A1* | 9/2011 | Himes | G16H 20/70 | 705/3 |
| 2011/0219325 A1* | 9/2011 | Himes | G16H 15/00 | 715/771 |
| 2012/0084288 A1* | 4/2012 | Abdul-Razzak | G06Q 90/00 | 707/E17.059 |
| 2012/0272153 A1* | 10/2012 | Grossman | G06Q 10/103 | 715/720 |
| 2012/0272173 A1* | 10/2012 | Grossman | G06Q 10/103 | 715/772 |
| 2013/0073995 A1* | 3/2013 | Piantino | G06Q 50/01 | 715/764 |
| 2013/0124996 A1* | 5/2013 | Margulis | G11B 27/34 | 715/719 |
| 2013/0185657 A1* | 7/2013 | Gunawardena | G06F 16/48 | 715/753 |
| 2014/0047312 A1* | 2/2014 | Ruble | G06F 16/50 | 715/212 |
| 2014/0059468 A1* | 2/2014 | Allgair | G06F 3/04842 | 715/771 |
| 2014/0255898 A1* | 9/2014 | Burge | G09B 5/08 | 434/350 |
| 2014/0310623 A1* | 10/2014 | O'Connell, Jr. | G06F 17/3089 | 715/764 |
| 2014/0331126 A1* | 11/2014 | Hunter | G06F 40/197 | 715/256 |
| 2014/0344191 A1* | 11/2014 | Lebow | G06N 5/02 | 706/11 |
| 2015/0089366 A1* | 3/2015 | Beckett | G06F 3/0484 | 715/716 |
| 2015/0347576 A1 | 12/2015 | Endert et al. | | |
| 2016/0027197 A1* | 1/2016 | Beckett | G06T 11/206 | 345/440 |
| 2016/0224676 A1* | 8/2016 | Miller | G06F 16/22 | |
| 2016/0378721 A1* | 12/2016 | Jarroush | H04L 51/22 | 715/765 |
| 2016/0378734 A1* | 12/2016 | Mullins | G06F 3/04845 | 715/229 |
| 2017/0083497 A1* | 3/2017 | Hosokawa | G06F 40/106 | |
| 2017/0109335 A1* | 4/2017 | Lee | G06F 3/04842 | |
| 2017/0201851 A1 | 7/2017 | Huang et al. | | |
| 2017/0235848 A1 | 8/2017 | Van Dusen et al. | | |
| 2017/0255686 A1* | 9/2017 | Ross | G06F 3/0482 | |
| 2017/0278016 A1 | 9/2017 | Jiang et al. | | |
| 2018/0081862 A1* | 3/2018 | Zhao | H04L 51/22 | 715/765 |
| 2018/0123995 A1* | 5/2018 | Xue | G06F 16/26 | |
| 2018/0137155 A1 | 5/2018 | Majumdar | | |
| 2018/0176661 A1* | 6/2018 | Varndell | H04N 21/83 | |
| 2018/0197034 A1* | 7/2018 | Scott | G06T 7/00 | |
| 2020/0142902 A1* | 5/2020 | Ross | G06F 16/287 | |
| 2020/0175099 A1* | 6/2020 | Ono | G06F 40/106 | |
| 2021/0216703 A1* | 7/2021 | Ono | G06F 40/106 | |

OTHER PUBLICATIONS

Cañas, Alberto J. et al. "CmapTools", 2004. <https://thomaseskridge.com/assets/pdf/Canas-2004.pdf> (Year: 2004).*

Dufilie, Andrew et al. Weave: A Web-based Architecture Supporting Asynchronous and Real-time Collaboration. AVI '12: Proc. of the Int'l Working Conf. on Advanced Visual Interfaces. Retrieved from <https://citeseerx.ist.psu.edu/document?repid=rep1&type=pdf&doi=38c4115e0d11c5530c6128cfa2d87ad7a98479f7> (Year: 2012).*

D. Billman, G. Convertino, J. Shrager, J. P. Massar, and P. Pirolli. Collaborative intelligence analysis with cache and its effects on information gathering and cognitive bias. In Human Computer Interaction Consortium Workshop, 2006.

M. Brehmer and T. Munzner. A multi-level typology of abstract visualization tasks. IEEE Trans. on Visualization and Computer Graphics, 19(12):2376-2385, 2013. doi: 10.1109/TVCG.2013.124.

S. Breslav, R. Goldstein, A. Khan, and K. Hornbæk. Exploratory sequential data analysis for multi-agent occupancy simulation results. In Proc. Symposium on Simulation for Architecture & Urban Design, pp. 59-66, 2015.

S. Breslav, A. Khan, and K. Hornbæk. Mimic: Visual analytics of online micro-interactions. In Proc. the International Working Conference on Advanced Visual Interfaces, pp. 245-252, 2014. doi: 10.1145/2598153. 2598168.

T. Chklovski, V. Ratnakar, and Y. Gil. User interfaces with semi-formal representations: a study of designing argumentation structures. In Proc. ACM conference on the Intelligent User Interfaces Conference, pp. 130-136, 2005.

W. Dou, D. H. Jeong, F. Stukes, W. Ribarsky, H. R. Lipford, and R. Chang. Recovering reasoning processes from user interactions. IEEE Computer Graphics and Applications, 29(3):52-61, 2009. doi: 10. 1109/MCG.2009.49.

M. Elias and A. Bezerianos. Annotating BI visualization dashboards: Needs & challenges. In Proc. SIGCHI Conference on Human Factors in Computing Systems, pp. 1641-1650, 2012. doi: 10.1145/2207676. 2208288.

D. Gotz and M. X. Zhou. Characterizing users' visual analytic activity for insight provenance. In Proc. IEEE Symposium on Visual Analytics Science and Technology, pp. 123-130, 2008. doi: 10.1109/VAST.2008.4677365.

(56) References Cited

OTHER PUBLICATIONS

J. Heer and B. Shneiderman. Interactive dynamics for visual analysis. Communications of ACM, 55(4):45-54, 2012. doi: 10.1145/2133806. 2133821.

T. J. Jankun-Kelly. Using visualization process graphs to improve visualization exploration. In J. Freire, D. Koop, and L. Moreau, eds., Provenance and Annotation of Data and Processes, pp. 78-91. Springer Berlin Heidelberg, 2008. doi: 10.1007/978-3-540-89965-5 10.

N. Mahyar and M. Tory. Supporting communication and coordination in collaborative sensemaking. IEEE Trans. on Visualization and Computer Graphics, 20(12):1633-1642, 2014. doi: 10.1109/TVCG.2014.2346573.

J. Pennington, R. Socher, and C. D. Manning. GloVe: Global vectors for word representation. In Proc. Empirical Methods in Natural Language Processing, pp. 1532-1543, 2014.

P. Pirolli and S. Card. The sensemaking process and leverage points for analyst technology as identified through cognitive task analysis. In Proc. International Conference on Intelligence Analysis, vol. 5, pp. 2-4, 2005.

P. M. Sanderson and C. Fisher. Exploratory sequential data analysis: Foundations. Human-Computer Interaction, 9(4):251-317, 1994. doi: 10. 1207/s15327051hci0903&4 2.

Y. B. Shrinivasan, D. Gotz, and J. Lu. Connecting the dots in visual analysis. In Proc. IEEE Symposium on Visual Analytics Science and Technology, pp. 123-130, 2009. doi: 10.1109/VAST.2009.5333023.

Y. B. Shrinivasan and J. J. van Wijk. Supporting the analytical reasoning process in information visualization. In Proc. SIGCHI Conference on Human Factors in Computing Systems, pp. 1237-1246, 2008. doi: 10. 1145/1357054.1357247.

W. Willett, J. Heer, J. Hellerstein, and M. Agrawala. CommentSpace: Structured support for collaborative visual analysis. In Proc. SIGCHI Conference on Human Factors in Computing Systems, pp. 3131-3140.

J. Zhao, D. Wigdor, and R. Balakrishnan. TrailMap: Facilitating information seeking in a multi-scale digital map via implicit bookmarking. In Proc. SIGCHI Conference on Human Factors in Computing Systems, pp. 3009-3018, 2013. doi: 10.1145/2470654.2481417.

Landesberger et al., Mobility Graphs-Visual Analysis of Mass Mobility Dynamics via Spatio-Temporal Graphs and Clustering, Oct. 25, 2015, IEEE Transactions on Visualization and Computer Graphics, vol. 22, No. 1, Jan. 2016, pp. 11-20.

Wartena et al., Using Tag Co-occurrence for Recommendation, Dec. 28, 2009, Intelligent Systems Design and Applications, 2009. ISDA '09, pp. 273-278.

Kang, Evaluating Visual Analytics Systems for Investigative Analysis: Deriving Design Principles from a Case Study, 8 pages.

Non-Final Office Action for U.S. Appl. No. 15/441,219, dated May 17, 2018, 18 pages.

Non-Final Office Action for U.S. Appl. No. 15/441,219, dated Jun. 3, 2019, 20 pages.

Final Office Action for U.S. Appl. No. 15/441,219, dated Nov. 18, 2019, 22 pages.

Non-Final Office Action for U.S. Appl. No. 15/441,219, dated Mar. 30, 2020, 21 pages.

Zhao et al., "Annotation Graphs: A Graph-Based Visualization for Meta-Analysis of Data based on User-Authored Annotations", IEEE Transactions on Visualization and Computer Graphics, vol. 23, No. 1, doi:10.1109/TVCG.2016.2598543, Jan. 2016, pp. 261-270.

Heer et al., "Voyagers and Voyeurs: Supporting Asynchronous Collaborative Visualization", Communications of the ACM, vol. 52, No. 1, Jan. 2009, pp. 87-97.

Hullman et al., "Contextifier: Automatic Generation of Annotated Stock Visualizations", Proceedings of the SIGCHI Conference on Human Factors in Computing Systems, Apr. 27-May 2, 2013, pp. 2707-2716.

Kandogan, Eser, "Just-in-time Annotation of Clusters, Outliers, and Trends in Point-based Data Visualizations", Proceedings of the IEEE Conference on Visual Analytics Science and Technology (VAST), Oct. 14-19, 2012, pp. 73-82.

Luther et al., "Pathfinder: An Online Collaboration Environment for Citizen Scientists", Proceedings of the SIGCHI Conference on Human Factors in Computing Systems, Apr. 6, 2009, pp. 239-248.

Marcus et al., "TwitInfo: Aggregating and Visualizing Microblogs for Event Exploration", Proceedings of the SIGCHI Conference on Human Factors in Computing Systems, May 7-12, 2011, pp. 227-236.

Andrews et al., "Space to Think: Large, High-Resolution Displays for Sensemaking", In Proceedings of the SIGCHI Conference on Human Factors in Computing Systems (CHI), DOI:http://dx.doi.org/10.1145/1753326.1753336, Apr. 10-15, 2010, pp. 55-64.

Billman et al., "Collaborative Intelligence Analysis with CACHE and its Effects on Information Gathering and Cognitive Bias", In Human Computer Interaction Consortium Workshop, 2006, pp. 1-35.

Blascheck et al., "VA/\2: A Visual Analytics Approach for // Evaluating Visual Analytics Applications", IEEE Transactions on Visualization and Computer Graphics, vol. 22, No. 1, doi:10.1109/TVCG.2015.2467871, Jan. 2016, pp. 61-70.

Brehmer et al., "A Multi-Level Typology of Abstract Visualization Tasks", IEEE Transactions on Visualization and Computer Graphics, vol. 19, No. 12, doi:10.1109/TVCG.2013.124, Dec. 2013, pp. 2376-2385.

Breslav, Simon, "UberTagger: Exploratory Analysis and Annotation of Sequential Data [software]", Available from https://github.com/sbreslav/UberTagger, latest commit Dec. 2015, site accessed Nov. 2019.

Breslav et al., "Exploratory Sequential Data Analysis for Multi-Agent Occupancy Simulation Results", In Proceedings Symposium on Simulation for Architecture & Urban Design, Apr. 12-15, 2015, pp. 59-66.

Breslav et al., "Mimic: Visual Analytics of Online Micro-interactions", In Proceedings the International Working Conference on Advanced Visual Interfaces, doi:10.1145/2598153.2598168, May 27-30, 2014, pp. 245-252.

Chin et al., "Exploring the Analytical Processes of Intelligence Analysts", In Proceedings SIGCHI Conference on Human Factors in Computing Systems, doi:10.1145/1518701.1518704, Apr. 6, 2009, pp. 11-20.

Chklovski et al., "User Interfaces with Semi-Formal Representations: A Study of Designing Argumentation Structures", In Proceedings ACM conference on Intelligent User Interfaces, Jan. 9-12, 2005, pp. 130-136.

Crowe et al., "Comparing Interfaces Based on What Users Watch and Do", In Proceedings the Symposium on Eye Tracking Research & Applications, doi:10.1145/355017.355022, 2000, pp. 29-36.

Elias et al., "Annotating BI Visualization Dashboards: Needs & Challenges", In Proceedings SIGCHI Conference on Human Factors in Computing Systems, doi:10.1145/2207676.2208288, May 5-10, 2012, pp. 1641-1650.

Gotz et al., "Characterizing Users' Visual Analytic Activity for Insight Provenance", In Proceedings IEEE Symposium on Visual Analytics Science and Technology, doi:10.1109/VAST.2008.4677365, Oct. 21-23, 2008, pp. 123-130.

Heer et al., "Interactive Dynamics for Visual Analysis", Communications of ACM, vol. 55, No. 4, doi:10.1145/2133806.2133821, Apr. 2012, pp. 45-54.

Jankun-Kelly, T.J., "Using Visualization Process Graphs to Improve Visualization Exploration", In J. Freire, D. Koop, and L. Moreau, eds., Provenance and Annotation of Data and Processes, doi:10.1007/978-3-540-89965-510, Springer Berlin Heidelberg, 2008, pp. 78-91.

Kang et al., "Characterizing the intelligence analysis process through a longitudinal field study: Implications for visual analytics", Information Visualization, vol. 13, No. 2, doi:10.1177/1473871612468877, 2014, pp. 134-158.

Mahyar et al., "A Closer Look at Note Taking in the Co-located Collaborative Visual Analytics Process", In Proceedings IEEE Symposium on Visual Analytics Science and Technology, doi:10.1109/VAST.2010.5652879, Oct. 24-29, 2010, pp. 171-178.

Moran et al., "Spatial Interpretation of Domain Objects Integrated into a Freeform Electronic Whiteboard", In Proceedings ACM

(56) References Cited

OTHER PUBLICATIONS

Symposium on User Interface Software and Technology, doi:10. 1145/288392.288600, 1998, pp. 175-184.

Pennington et al., "GloVe: Global Vectors for Word Representation", In Proceedings Empirical Methods in Natural Language Processing, Oct. 25-29, 2014, pp. 1532-1543.

Pirolli et al., "The Sensemaking Process and Leverage Points for Analyst Technology as Identified Through Cognitive Task Analysis", In Proceedings International Conference on Intelligence Analysis, vol. 5, 2005, 6 pages.

Sanderson et al., "Exploratory Sequential Data Analysis: Foundations", Human-Computer Interaction, vol. 9, No. 4, doi:10.1207/s15327051hci0903&4_2, 1994, pp. 251-317.

Shrinivasan et al., "Connecting the Dots in Visual Analysis", In Proceedings IEEE Symposium on Visual Analytics Science and Technology, doi:10.1109/VAST.2009.5333023, Oct. 12-13, 2009, pp. 123-130.

Shrinivasan et al., "Supporting the Analytical Reasoning Process in Information Visualization", In Proceedings SIGCHI Conference on Human Factors in Computing Systems, doi:10.1145/1357054. 1357247, Apr. 5-10, 2008, pp. 1237-1246.

Wattenberg, Martin, "Visual Exploration of Multivariate Graphs", In Proceedings SIGCHI conference on Human Factors in computing systems, doi:10.1145/1124772.1124891, Apr. 22-27, 2006, pp. 811-819.

Zhao et al., "TrailMap: Facilitating Information Seeking in a Multi-Scale Digital Map via Implicit Bookmarking", In Proceedings SIGCHI Conference on Human Factors in Computing Systems, doi:10.1145/2470654.2481417, Apr. 27-May 2, 2013, pp. 3009-3018.

Paul, S. A. , Understanding Together: Sensemaking in Collaborative Information Seeking. PHD thesis, the Pennsylvania State University, May 2010, 267 pages.

Final Office Action for U.S. Appl. No. 15/441,219, dated Dec. 5, 2018, 20 pages.

Alexander et al., "Revisiting Read Wear: Analysis, Design, and Evaluation of a Footprints Scrollbar", In Proceedings of the Conference on Human Factors in Computing Systems (CHI), doi:10. 1145/1518701.1518957, ACM, Apr. 8, 2009, pp. 1665-1674.

Badam et al., "Polychrome: A Cross-Device Framework for Collaborative Web Visualization", In Proceedings of the International Conference on Interactive Tabletops and Surfaces (ITS), doi:10. 1145/2669485.2669518, ACM,Nov. 16-19, 2014, pp. 109-118.

Bier et al., "Principles and Tools for Collaborative Entity-Based Intelligence Analysis", IEEE Transactions on Visualization and Computer Graphics, vol. 16, No. 2, doi:10.1109/TVCG.2009.104, Mar.-Apr. 2010, pp. 178-191.

Callahan et al., "VisTrails: Visualization meets Data Management", In Proceedings of the 2006 ACM SIGMOD International Conference on Management of Data, doi:10.1145/1142473.1142574, Jun. 27-29, 2006, pp. 745-747.

Chang et al., "WireVis: Visualization of Categorical, Time-Varying Data from Financial Transactions", In IEEE Symposium on Visual Analytics Science and Technology, doi:10.1109/VAST.2007. 4389009, Oct. 30-Nov. 1, 2007, pp. 155-162.

Chen et al., "Supporting Effective Common Ground Construction in Asynchronous Collaborative Visual Analytics", In Proceedings of the Symposium on Visual Analytics Science and Technology (VAST), doi:10.1109/VAST.2011.6102447, IEEE, Oct. 23-28, 2011, pp. 101-110.

Chung et al., "VizCept: Supporting Synchronous Collaboration for Constructing Visualizations in Intelligence Analysis", In Proceedings of the Symposium on Visual Analytics Science and Technology (VAST), doi:10.1109/VAST.2010.5652932, IEEE, Oct. 24-29, 2010, pp. 107-114.

Dou et al., "Recovering Reasoning Processes from User Interactions", IEEE Computer Graphics and Applications, doi:10.1109/MCG.2009.49, vol. 29, No. 3, May-Jun. 2009, pp. 52-61.

Gava et al., "The 3C Cooperation Model Applied to the Classical Requirement Analysis", Journal of Information Systems and Technology Management, doi:10.4301/s1807-17752012000200003, vol. 9, No. 2, May-Aug. 2012, pp. 235-264.

Grinstein et al., "Vast 2006 Contest—A Tale of Alderwood", In Proceedings of the Symposium on Visual Analytics Science and Technology, doi:10.1109/VAST.2006.261420, IEEE, Oct. 31-Nov. 2, 2006, pp. 215-216.

Grossman et al., "Chronicle: Capture, Exploration, and Playback of Document Workflow Histories", In Proceedings of the Symposium on User Interface Software and Technology (UIST), doi:10.1145/1866029.1866054pp, ACM, Oct. 3-6, 2010, pp. 143-152.

Hamilton et al., "Conductor: Enabling and Understanding Cross-Device Interaction", In Proceedings of the Conference on Human Factors in Computing Systems (CHI), doi:10.1145/2556288. 2557170, ACM, Apr. 26-May 1, 2014, pp. 2773-2782.

Heer et al., "Design considerations for collaborative visual analytics", Information Visualization, vol. 7, No. 1, doi:10.1057/palgrave. ivs.9500167, Mar. 2008, pp. 49-62.

Heer et al., "Graphical Histories for Visualization: Supporting Analysis, Communication, and Evaluation", IEEE Transactions on Visualization and Computer Graphics, vol. 14, No. 6, doi:10.1109/TVCG.2008.137, Nov.-Nov. 2008, pp. 1189-1196.

Heer et al., "Voyagers and Voyeurs: Supporting Asynchronous Collaborative Information Visualization", In Proceedings of the Conference on Human Factors in Computing Systems (CHI), doi:10. 1145/1240624.1240781, ACM, Apr. 28-May 3, 2007, pp. 1029-1038.

Isenberg et al., "Interactive Tree Comparison for Co-located Collaborative Information Visualization", IEEE Transactions on Visualization and Computer Graphics, vol. 13, No. 6, doi:10.1109/TVCG. 2007.70568, Nov.-Dec. 2007, pp. 1232-1239.

Isenberg et al., "Collaborative visualization: Definition, challenges, and research agenda", Information Visualization, vol. 10, No. 4, doi:10.1177/1473871611412817, Oct. 2011, pp. 310-326.

Isenberg et al., "Collaborative Brushing and Linking for Co-located Visual Analytics of Document Collections", In Computer Graphics Forum, doi:10.1111/j.1467-8659.2009.01444.x, vol. 28, No. 3, Wiley Online Library, Jun. 2009, pp. 1031-1038.

Isenberg et al., "Co-Located Collaborative Visual Analytics around a Tabletop Display", IEEE Transactions on Visualization and Computer Graphics, vol. 18, No. 5, doi:10.1109/TVCG.2011.287, May 2012, pp. 689-702.

Isenberg et al., "An Exploratory Study of Visual Information Analysis", In Proceedings of the Conference on Human Factors in Computing Systems (CHI), doi:10.1145/1357054.1357245, ACM, Apr. 5-10, 2008, pp. 1217-1226.

Jakobsen et al., "Up Close and Personal: Collaborative Work on a High-Resolution Multitouch Wall Display", Transactions on Computer-Human Interaction (TOCHI), vol. 21, No. 2, Article 11, doi:10. 1145/2576099, Feb. 2014, pp. 11:1-11:34.

Kadivar et al., "Capturing and Supporting the Analysis Process", In Proceedings of the Symposium on Visual Analytics Science and Technology (VAST), doi:10.1109/VAST.2009.5333020, IEEE, Oct. 12-13, 2009, pp. 131-138.

Kang et al., "Evaluating Visual Analytics Systems for Investigative Analysis: Deriving Design Principles from a Case Study", In Proceedings of the Symposium on Visual Analytics Science and Technology (VAST), doi:10.1109/VAST.2009.5333878, IEEE, Oct. 12-13, 2009, pp. 139-146.

Kang et al., "Characterizing the Intelligence Analysis Process: Informing Visual Analytics Design through a Longitudinal Field Study", In Visual Analytics Science and Technology (VAST), doi:10.1109/VAST.2011.61024382011, IEEE Symposium on, Oct. 23-28, 2011, pp. 21-30.

Keel, Paul E., "Collaborative Visual Analytics: Inferring from the Spatial Organization and Collaborative Use of Information", In Proceedings of the Symposium on Visual Analytics Science and Technology (VAST), doi:10.1109/VAST.2006.261415, IEEE, Oct. 31-Nov. 2, 2006, pp. 137-144.

Krzywinski et al., "Points of Significance: Error Bars", Nature Methods, vol. 10, No. 10, doi:10.1038/nmeth.2659, Oct. 2013, pp. 921-922.

(56)                References Cited

OTHER PUBLICATIONS

Kwon et al., "Evaluating the Role of Time in Investigative Analysis of Document Collections", IEEE Transactions on Visualization and Computer Graphics, vol. 18, No. 11, doi:10.1109/TVCG.2012.89, Nov. 2012, pp. 1992-2004.

Mahyar et al., "Supporting Communication and Coordination in Collaborative Sensemaking", IEEE Transactions on Visualization and Computer Graphics, vol. 20, No. 12, doi:10.1109/TVCG.2014.2346573, Dec. 2014, pp. 1633-1642.

Mcgrath et al. Branch-explore-merge: facilitating real-time revision control in co-located collaborative visual exploration. In Proceedings of the Conference on Interactive Tabletops and Surfaces (ITS), doi:10.1145/2396636.2396673 pp. 235-244. ACM, 2012.

Morris et al., "SearchTogether: An Interface for Collaborative Web Search", In Proceedings of Symposium on User Interface Software and Technology (UIST), doi:10.1145/1294211.1294215, ACM, Oct. 7-10, 2007, pp. 3-12.

Paul et al., "Understanding Together: Sensemaking in Collaborative Information Seeking", In Proceedings of Conference on Computer Supported Cooperative Work (CSCW), doi:10.1145/1718918.1718976, ACM, Feb. 6-10, 2010, pp. 321-330.

Pirolli et al., "Information Foraging", Psychological Review, doi:10.1037/0033-295X.106.4.643, vol. 106, No. 4, Oct. 1999, pp. 643-675.

Prue et al., "Overcoming Limited Collaboration Channels in Distributed Intelligence Analysis: Visualization Tools and Design Seeds", In Proceedings of the Joint Intelligence and Security Informatics Conference (JISIC), doi:10.1109/JISIC.2014.13, IEEE, 2014, pp. 17-24.

Ragan et al., "Characterizing Provenance in Visualization and Data Analysis: An Organizational Framework of Provenance Types and Purposes", IEEE Transactions on Visualization and Computer Graphics, vol. 22, No. 1, doi:10.1109/TVCG.2015.2467551, Jan. 2016, pp. 31-40.

Robinson, Anthony C., "Collaborative Synthesis of Visual Analytic Results", In Proceedings of the Symposium on Visual Analytics Science and Technology (VAST), doi:10.1109/VAST.2008.4677358, IEEE, Oct. 21-23, 2008, pp. 67-74.

Russell et al., "Sensemaking for the rest of us", In Proceedings of the ACM CHI Sensemaking Workshop, Apr. 7, 2008, 7 pages.

Russell et al., "The Cost Structure of Sensemaking", In Proceedings Conference on Human Factors in Computing Systems (CHI/Interact), doi:10.1145/169059.169209, ACM, Apr. 24-29, 1993, pp. 269-276.

Sarvghad et al., "Exploiting Analysis History to Support Collaborative Data Analysis", In Proceedings of the Graphics Interface Conference (GI), doi:10.20380/GI2015.16, Canadian Information Processing Society, Jun. 3-5, 2015, pp. 123-130.

Sarvghad et al., "Visualizing Dimension Coverage to Support Exploratory Analysis", IEEE Transactions on Visualization and Computer Graphics, vol. 23, No. 1, doi:10.1109/TVCG.2016.2598466, Jan. 2017, pp. 21-30.

Scholtz et al., "User-Centered Design Guidelines for Collaborative Software for Intelligence Analysis", In International Conference on Collaboration Technologies and Systems (CTS), doi:10.1109/CTS.2014.6867610, IEEE, 2014, pp. 478-482.

Sharma, Nikhil, "Sensemaking Handoff: When and how?", Proceedings of the American Society for Information Science and Technology, vol. 45, No. 1, doi:10.1002/meet.2008.1450450234, Jun. 2008, pp. 1-12.

Sharma et al., "Artifact Usefulness and Usage in Sensemaking Handoffs", Proceedings of the Association for Information Science and Technology, vol. 46, No. 1, doi:10.1002/meet.2009.1450460219, Nov. 2009, 1-19 pages.

Stasko et al., "Jigsaw: Supporting investigative analysis through interactive visualization", Information Visualization, vol. 7, No. 2, doi:10.1057/palgrave.ivs.9500180, Jun. 2008, pp. 118-132.

Viegas et al., "Many Eyes: A Site for Visualization at Internet Scale", Transactions on Visualization and Computer Graphics, vol. 13, No. 6, doi:10.1109/TVCG.2007.70577, Nov.-Dec. 2007, pp. 1121-1128.

Vogt et al., "Co-located Collaborative Sensemaking on a Large High-Resolution Display with Multiple Input Devices", In IFIP Conference on Human-Computer Interaction (Interact), doi:10.1007/978-3-642-23771-3 44, Springer, 2011, pp. 589-604.

Wattenberg et al., "Designing for Social Data Analysis", Transactions on Visualization and Computer Graphics, vol. 12, No. 4, doi:10.1109/TVCG.2006.65, Jul.-Aug. 2006, pp. 549-557.

Willett et al., Scented Widgets: Improving Navigation Cues with Embedded Visualizations, Transactions on Visualization and Computer Graphics, vol. 13, No. 6, doi:10.1109/TVCG.2007.70589, Nov.-Dec. 2007, pp. 1129-1136.

Willett et al., "CommentSpace: Structured Support for Collaborative Visual Analysis", In Proceedings of the Conference on Human Factors in Computing Systems (CHI), doi:10.1145/1978942.1979407, ACM, May 7-12, 2011, pp. 3131-3140.

Wright et al., "The Sandbox for Analysis: Concepts and Methods", In Proceedings of the Conference on Human Factors in Computing Systems (CHI), doi:10.1145/1124772.1124890, ACM, Apr. 22-27, 2006, pp. 801-810.

Xu et al., "Analytic Provenance for Sensemaking: A Research Agenda", IEEE Computer Graphics and Applications, vol. 35, No. 3, doi:10.1109/MCG.2015.50, May 2015, pp. 56-64.

Non-Final Office Action received for U.S. Appl. No. 15/441,219, dated Mar. 30, 2020, 21 pages.

Final Office Action received for U.S. Appl. No. 15/441,219, dated Sep. 14, 2020, 41 pages.

Breslav et al., Exploratory Sequential Data Analysis for Multi-Agent Occupancy Simulation Results, published at Sim AUD2015, Apr. 12-15, 2015, p. 8 (Year:2015).

Final Office Action received for U.S. Appl. No. 15/441,219, dated Nov. 29, 2021, 27 pages.

Non Final Office Action received for U.S. Appl. No. 15/441,219, dated Apr. 20, 2022, 21 pages.

Non Final Office Action received for U.S. Appl. No. 15/441,219, dated Jun. 1, 2021, 21 pages.

Notice of Allowance received for U.S. Appl. No. 15/441,219, dated Jan. 13, 2023, 11 pages.

Final Office Action received for U.S. Appl. No. 15/441,219, dated Aug. 11, 2022, 27 pages.

* cited by examiner

700

HANDOFF SUPPORT IN ASYNCHRONOUS ANALYSIS TASKS USING KNOWLEDGE TRANSFER GRAPHS

CROSS-REFERENCE TO RELATED APPLICATIONS

This application is a continuation-in-part of co-pending U.S. patent application Ser. No. 15/441,219, filed on Feb. 23, 2017, which claims the priority benefit of the U.S. Provisional Patent Application having Ser. No. 62/398,433 and filed on Sep. 22, 2016. This application also claims the priority benefit of the U.S. Provisional Patent Application having Ser. No. 62/557,112 and filed on Sep. 11, 2017. The subject matter of these related applications is hereby incorporated herein by reference.

BACKGROUND OF THE INVENTION

Field of the Invention

Embodiments of the present invention relate generally to computer science and, more specifically, to handoff support in asynchronous analysis tasks using knowledge transfer graphs.

Description of the Related Art

When performing "sense-making" operations, users attempt to analyze, interpret, and extract meaning from various data sets. During sense-making operations, users oftentimes annotate their data sets in order to document and communicate observations and hypotheses about the data sets. For example, as part of analyzing a relatively large data set, various users could annotate the data set with a wide range of light-weight annotations and heavy-weight annotations, where the light-weight annotations may include short tags, and the heavy-weight annotations may include long comments.

As the size and complexity of a data set grow, the number and diversity of annotations associated with the data set oftentimes increase as well. In addition, as the size and complexity of a data set grow, the complexity of the relationships between the different annotations and the data set typically increases too. For example, a user could structure a hierarchical relationship between tags and comments to provide insights into the data set at different levels of detail. Subsequently, the user could create relationships between specific tags, comments, and data items included in the data set to organize those insights.

In environments that have multiple collaborators working on the same data set, the sense-making operations enable collaborators to provide their own insights and observations to the data set, with each provider adding her own annotations. However, collaborations usually have difficulty in transferring knowledge gained between individual collaborators (referred to herein as a "handoff"). When collaborators are separated by time and distance, for example, one collaborator could have difficulty performing a handoff of certain information, such as process or strategy employed by the collaborator, to another collaborator. Similarly, one drawback of using complex sense-making operations for collaborations is the handoff of annotation sets between different collaborators. More specifically, while an initial collaborator understands his/her process in analyzing a given data set and generating annotations for that data set, other collaborators may not be able to accurately decipher the set of annotations to understand the thought process of the initial collaborator when he/she added the various annotations.

With some sense-making operations, a system may employ a revision control system to track changes between different users when editing and working with the same data set. One drawback of conventional revision control systems is that such systems are typically designed to track changes to a data set only in collaboration environments having tangible goals, and where tasks are well-defined for collaborators working within those environments. When collaborators know the goals and tasks of a given project, each collaborator is able to handoff project information more easily through simple edits or comments to the data set. By contrast, collaborators have much greater difficulty using conventional revision control systems to perform handoffs in collaboration environments where the goals and tasks are ill-defined and non-routine. With ill-defined and non-routine goals and tasks, simple edits and comments to a data set are typically not enough to properly convey strategy or process.

As the foregoing illustrates, what is needed in the art are more effective techniques for performing handoffs in collaboration environments having goals and tasks that are not well-defined.

SUMMARY OF THE INVENTION

One embodiment of the present application sets forth a method for playback of a sense-making operation. The method includes receiving first session data that includes a set of timeline steps. Each timeline step included in the set of timeline steps corresponds to a user action performed on a data set. The method further includes receiving a playback command to display a first sequence of timeline steps included in the set of timeline steps. The method further includes rendering a first graph for display based on at least one timeline step included in the first sequence of timeline steps.

Advantageously, the techniques herein enable an accurate handoff between collaborators interacting with a common data set in a collaboration environment. Unlike conventional revision control systems, the annotation subsystem enables a user to provide handoff in a collaboration environment that involves ill-defined and non-routine goals and tasks.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
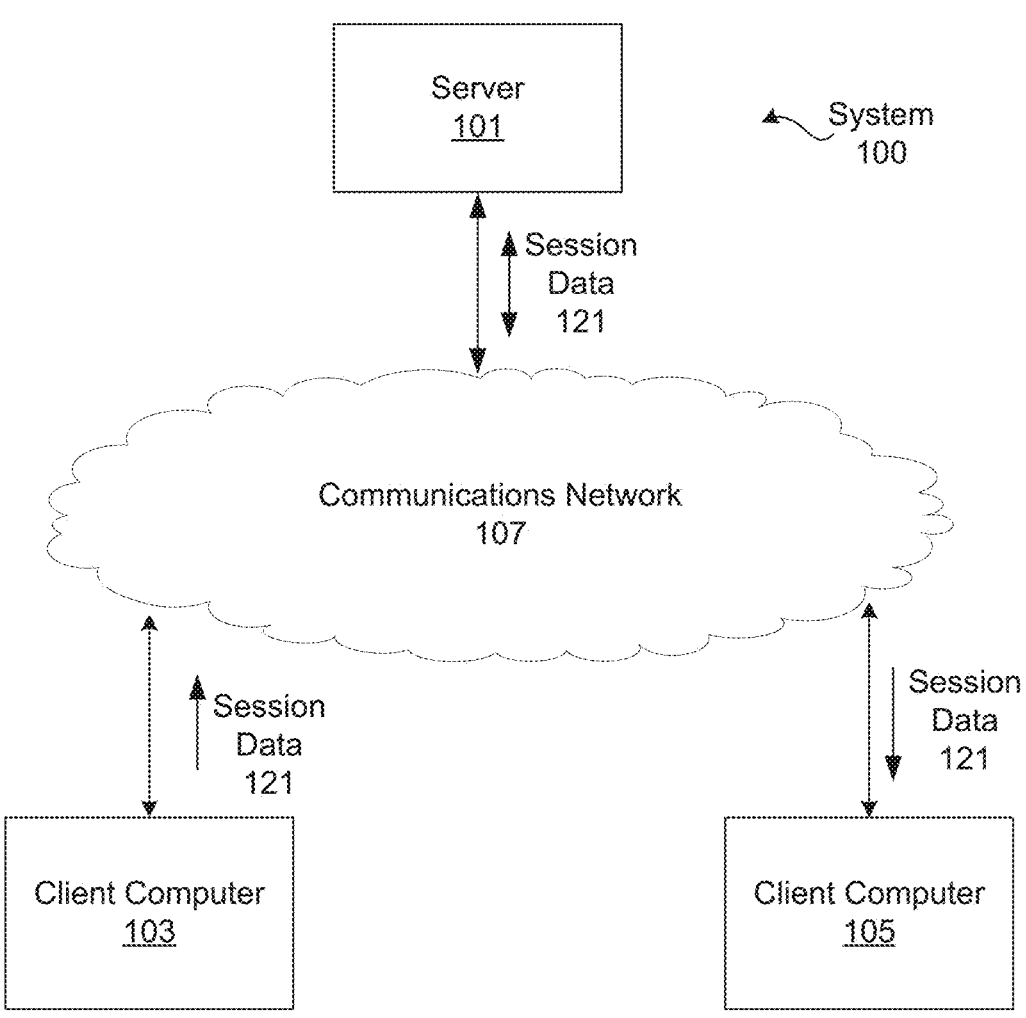
FIG. 1 is a conceptual illustration of a system configured to implement one or more aspects of the present invention.

FIG. 1 is a conceptual illustration of a system 100 configured to implement one or more aspects of the present invention. As shown, system 100 includes, without limitation, server 101, client computers 103, 105, and communications network 107. In alternative embodiments, system 100 may include any number of client computers 103, 105 and servers 101, in any combination. In some embodiments, system 100 includes a collaborative environment including client computers 103, 105 and server 101. In operation, client computer 103 creates session data 121 when performing sense-making operations while working on a data set. In operation, session data 121 is sent to server 101 via communications network 107. Client computer 105 may subsequently receive session data 121 from server 101 via communications network 107.

Server 101 comprises a computer system configured to receive session data 121 from client computers 103, 105 and store session data 121, along with other data associated with a data set. As will be discussed in further detail below, other data associated with a data set can include visualization data, annotation data, and/or contextual data. When client computer 103, 105 retrieves the data set, client computer 103, 105 may also retrieve from server 101 session data 121, as well as other data associated with the data set. In some embodiments, client computer 103, 105 may use information in session data 121 to enable playback of the session of sense-making operations performed on client computer 103. Session data 121 may be formatted and stored on a mass storage system at server 101 using any technically-feasible technique. A data transfer protocol, such as hypertext transfer protocol (HTTP), may be used to download session data 121 from server 101 to client computer 103, 105.

Client computers 103, 105 communicate with server 101 via communications network 107 to retrieve and store a data set and associated data, including session data 121, annotation data, visualization data, and/or contextual data. Client computer 103, 105 can be a desktop computer, laptop computer, mobile computer, or any other type computing system configured to receive input, process data, display images, and is suitable for practicing one or more embodiments of the present invention. As will be discussed in greater detail below, client computer 103, 105 is configured to enable a user to interact with the data set and session data 121 via a graphical user interface (GUI) rendered on a display.

Communications network 107 includes a plurality of network communications systems, such as routers and switches, configured to facilitate data communication between client computers 103, 105 and server 101. Persons skilled in the art will recognize that many technically-feasible techniques exist for building communications network 107, including technologies practiced in deploying the well-known internet communications network. For example, communications network 107 may include a wide-area network (WAN), a local-area network (LAN), and/or a wireless (Wi-Fi) network, among others.

Session data 121 includes data associated with user actions recorded when the user performs sense-making operations while working with a data set. As will be discussed in further detail below, in some embodiments, client computer 103 may store each user action when the user is performing sense-making operations while working on a data set via an annotation subsystem. Client computer 103 records each of the user actions as discrete timeline steps and collects the set of timeline steps in session data 121. In some embodiments, once a user completes a session sense-making operations while working on the data set, client computer 103 may store session data 121 locally and may send session data 121 to server 101. In some embodiments, when client computer 103, 105 initiates another session of sense-making operations while working with the data set, client computer 103, 105 may retrieve session data 121 from server 101. After receiving session data 121, during a subsequent session, client computer 103, 105 may replay one or more timeline steps saved in session data 121. In some embodiments, a user can perform sense-making operations while working on the data set in a subsequent session. The user actions may be based on the last step recorded in session data 121. In such instances, client computer 103, 105 may store the user actions performed during the subsequent session as separate session data 121. Server 101 stores as distinct files session data 121 for each session of sense-making operations on the data set. In alternative embodiments, server 101 may store one file of session data 121 associated with the data set and update the session data 121 with during each session of sense-making operations on the data set.

Figure 2:
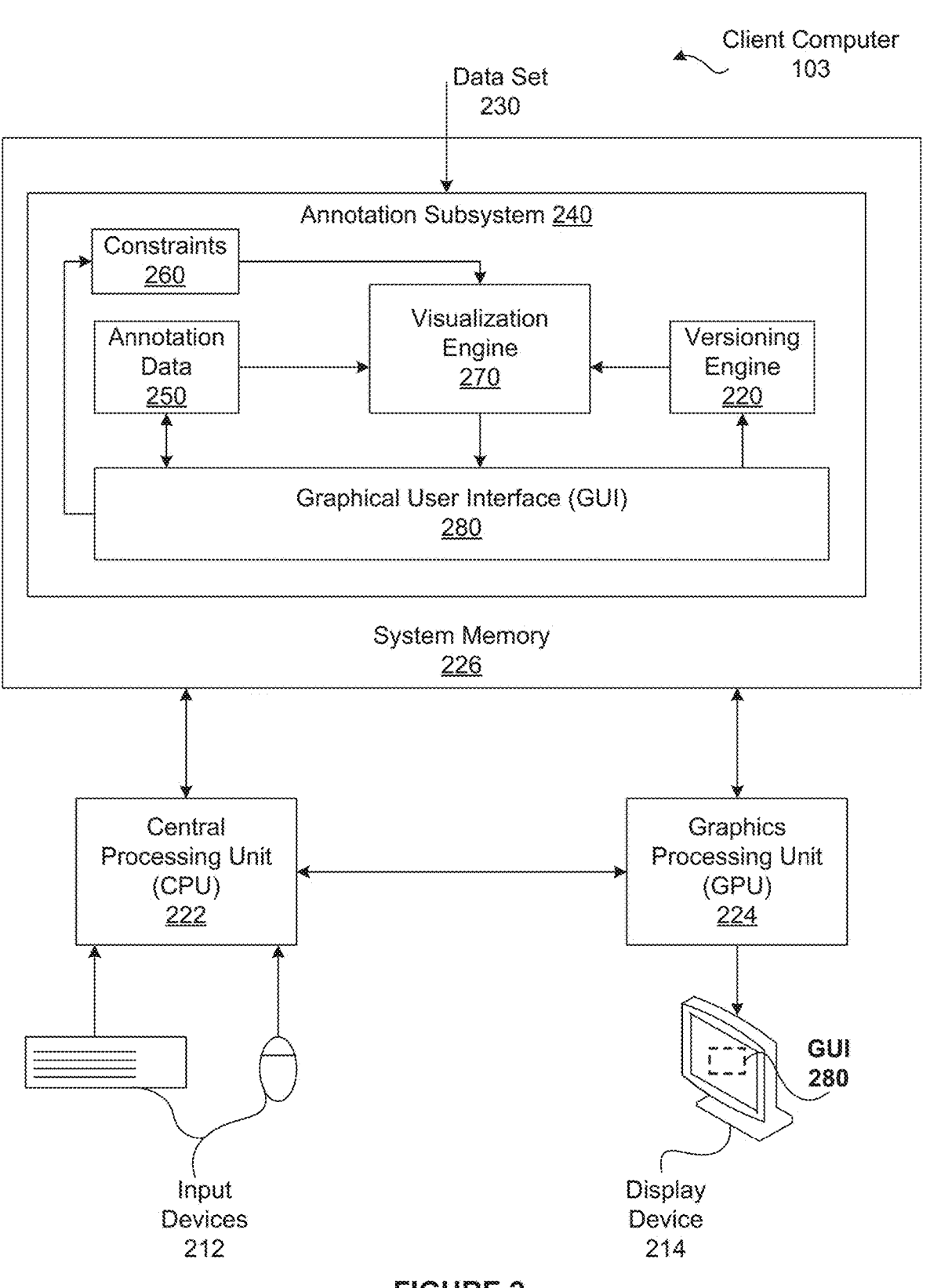
FIG. 2 is a more detailed illustration of the client computer of FIG. 1, according to various embodiments of the present invention.

FIG. 2 is a more detailed illustration of the client computer 103 of FIG. 1, according to various embodiments of the present invention. As shown, the client computer 103 includes, without limitation, central processing unit (CPU) 222, input devices 212, graphics processing unit (GPU) 224, display device 214, and system memory 226. In some embodiments, client computer 105 may include similar components. For explanatory purposes, multiple instances of like objects are denoted with reference numbers identifying the object and parenthetical numbers identifying the instance, where needed.

CPU 222 receives user input from input devices 212, such as a keyboard or a mouse. In operation, CPU 222 is the master processor of client computer 103, controlling and coordinating operations of other system components. In particular, CPU 222 issues commands that control the operation of GPU 224. GPU 124 incorporates circuitry optimized for graphics and video processing, including, for example, video output circuitry. GPU 224 delivers pixels to the display device 214 that may be any conventional cathode ray tube, liquid crystal display, light-emitting diode display, or the like.

In various embodiments, GPU 224 may be integrated with one or more of other elements of FIG. 2 to form a single subsystem for client computer 103. For example, GPU 224 may be integrated with CPU 222 and other connection circuitry on a single chip to form a system on chip (SoC). In alternate embodiments, CPU 222 and/or GPU 224 may be replaced with any number of processors. Each of the processors may be any instruction execution system, apparatus, or device capable of executing instructions. For example, a processor could comprise a digital signal processor (DSP), a controller, a microcontroller, a state machine, or any combination thereof.

System memory 226 stores content, such as software applications and data, for use by CPU 222 and GPU 224.

System memory 226 may be any type of memory capable of storing data and software applications, such as random-access memory (RAM), read-only memory (ROM), erasable programmable read-only memory (EPROM or Flash ROM), or any suitable combination of the foregoing. In some embodiments, storage (not shown) may supplement or replace system memory 226. The storage may include any number and type of external memories that are accessible to CPU 222 and/or GPU 224. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that client computer 103 shown herein is illustrative and that variations and modifications are possible. The number of CPUs 222, number of GPUs 224, number of system memories 226, and number of applications included in system memory 226 may be modified as desired. Further, the connection topology between the various units in FIG. 2 may be modified as desired. In some embodiments, any combination of CPU 222, GPU 224, and system memory 226 may be replaced with any type of distributed computer system or cloud computing environment, such as a public or a hybrid cloud.

In general, client computer 103 enables users to perform sense-making operations to analyze, interpret, and attempt to extract meaning from data set 230. In some embodiments, during sense-making operations on data set 230, users may oftentimes annotate data set 230 in order to document and communicate observations and hypotheses about data set 230. As the size and complexity of data set 230 grows, the number and diversity of annotations associated with data set 230 oftentimes increases as well. In addition, as the size and complexity of data set 230 grows, the complexity of the relationships between the different annotations and data set 230 typically increases too.

As persons skilled in the art will recognize, a user may generate a set of annotations that includes a high level of complexity and detail. These annotations illustrate an intricate set of relationships between data points included in data set 230 while also illustrating the strategy, process, and progress of a user when performing a sense-making session on data set 230. However, one drawback of creating an intricate set of annotation data 250 for data set 230 is that other users reviewing the complete set of annotation data 250 have difficulty accurately determining the strategy and progress of a user during her sense-making session. As will be discussed in further detail below, a user may generate a large volume of data associated with data set 230 during a sense-making session, including annotation data 250, visualization data, and/or contextual data. A user reviewing the large volume of data from the previous sense-making session has difficulty following the process performed by the previous user, as the final set of annotation data 250, visualization data, and/or contextual data does not convey how the user, for example, conducted searches, generated relationships, and/or generated observations and hypotheses.

Sense-Making Operations on Data Sets

To enable users to effectively perform, record, and play-back sense-making operations associated with data set 230, client computer 103 includes, without limitation, annotation subsystem 240. As shown, annotation subsystem 240 includes, without limitation, versioning engine 220, annotation data 250, constraints 260, visualization engine 270, and graphical user interface (GUI) 280. In operation, annotation subsystem 240 executes on CPU 222 and/or GPU 224, and configures display device 214 to display GUI 280. In general, GUI 280 provides a variety of visual components (e.g., interface widgets, search widgets, panels, tabs, etc.) that enable the user to perform graphics-based sense-making operations on data set 230 via input devices 212.

More precisely, GUI 280 enables the user to view and select items included in data set 230, interact with annotation data 250 that is associated with data set 230, and influence an automatically-generated annotation graph (not shown in FIG. 2) via constraints 260 and visualization engine 270. Notably, the items included in data set 230 may be organized in any manner and across any number of hierarchical levels. For explanatory purposes only, an item included in data set 230 is referred to herein as a "data item" and is associated with a hierarchical level. Annotation data 250 includes annotations, as well as data items that are associated with annotations. Examples of annotations include comments and tags. For explanatory purposes only, a data item that is associated with at least one annotation is also referred to herein as an "annotated data item."

Visualization engine 270 automatically generates an annotation graph based on annotation data 250, and in some embodiments, constraints 260. In some embodiments, visualization engine 270 may receive session data 121 from versioning engine 220 and replay annotations being added, removed, and/or moved based on recorded user actions (referred to herein as "timeline steps") recorded in session data 121. The annotation graph is defined by a topology and a layout. To generate the topology of the annotation graph, visualization engine 270 encodes annotation semantics that describe the content of and relationships among nodes that represent the different annotations and annotated data items included in annotation data 250. To generate the layout of the annotation graph, visualization engine 270 retrieves a layout associated with the annotation graph. In some embodiments, visualization engine 270 automatically infers similarities among the different annotations and annotated data items and then organizes the nodes based on the similarities and the user-specified constraints 260. In alternative embodiments, a user may specify a layout and visualization engine 270 may store the location of the manually-placed nodes in the layout associated with the annotation graph.

In some embodiments, visualization engine 270 may implement a "mixed-initiative" visualization of annotation data 250 in which the user influences an automatically-generated layout of the annotation graph. In such instances, the user may efficiently explore salient aspects of data set 230 via annotation data 250 by interactively constraining the layout of the annotation graph and then inspecting the topology of the automatically-generated annotation graph. In alternative embodiments, visualization engine 270 may replay the layout set by a user and associated user actions performed by the user in an earlier sense-making session by illustrating timeline steps stored in session data 121. In such instances, the user may accurately follow the strategy and process of a previous user when that user was generating annotation data 250.

Note that the techniques described herein are illustrative rather than restrictive, and may be altered without departing from the broader spirit and scope of the invention. Many modifications and variations on the functionality provided by versioning engine 220, annotation subsystem 240, and visualization engine 270 will be apparent to those of ordinary skill in the art without departing from the scope and spirit of the described embodiments. In various embodiments, any number of the techniques may be implemented while other techniques may be omitted. Alternate embodiments include any application that implements a mixed-initiative process that combines computed similarities among data with any number and type of user-specified constraints to generate any type of graph. Alternative embodiments also include any application that implements replay of a sequence of user actions recorded as discrete steps through visualization of the state of the data set and associated data at the time the user performed each of the user actions.

For instance, in some alternative embodiments, client computer 103 may not include annotation subsystem 240, versioning engine 220, and/or annotation data 250. In such embodiments, visualization engine 270 may operate directly on the data items and/or session data 121 instead of annotation data 250 to generate a data graph instead of an annotation graph. Data set 230 may include any number and type of data items, and the associated data graph may include any number and type of nodes. In some embodiments, to generate the layout of the data graph, visualization engine 270 may automatically infer similarities from data set 230 and then organize the nodes based on the similarities and the user-specified constraints 260. Versioning engine 220 may store the user actions performed to generate the data graph as session data 121.

In alternate embodiments, system memory 226 may not include annotation subsystem 240, versioning engine 220, and/or visualization engine 270. In some embodiments, annotation subsystem 240, versioning engine 220, and/or visualization engine 270 may be stored on computer-readable media, such as a CD-ROM, DVD-ROM, flash memory module, or other tangible storage media. Further, in some embodiments, annotation subsystem 240, versioning engine 220, and/or visualization engine 270 may be provided as an application program (or programs) stored on computer-readable media such as a CD-ROM, DVD-ROM, flash memory module, or other tangible storage media.

The components illustrated in client computer 103 may be included in any type of client computer 103, e.g., desktop computers, server computers, laptop computers, tablet computers, and the like. Additionally, annotation subsystem 240, versioning engine 220, and/or visualization engine 270 may execute on distributed systems communicating over computer networks, including LANs, or large, WANs, such as the Internet. Annotation subsystem 240, versioning engine 220, and visualization engine 270 described herein are not limited to any particular computing system and may be adapted to take advantage of new computing systems as they become available. In alternate embodiments, the functionality of annotation subsystem 240, versioning engine 220, and visualization engine 270 may be implemented and provided in any technically-feasible fashion. In various embodiments, the functionality of annotation subsystem 240, versioning engine 220, and/or visualization engine 270 is integrated into or distributed across any number (including one) of software applications. Further, in some embodiments, each of the annotation subsystem 240, versioning engine 220, and visualization engine 270 may execute on different instruction execution systems. For instance, in some embodiments the functionality of versioning engine 220, and/or visualization engine 270 may be provided as a cloud-based service.

Mixed-Initiative Visualization of Annotation Data

Figure 3:
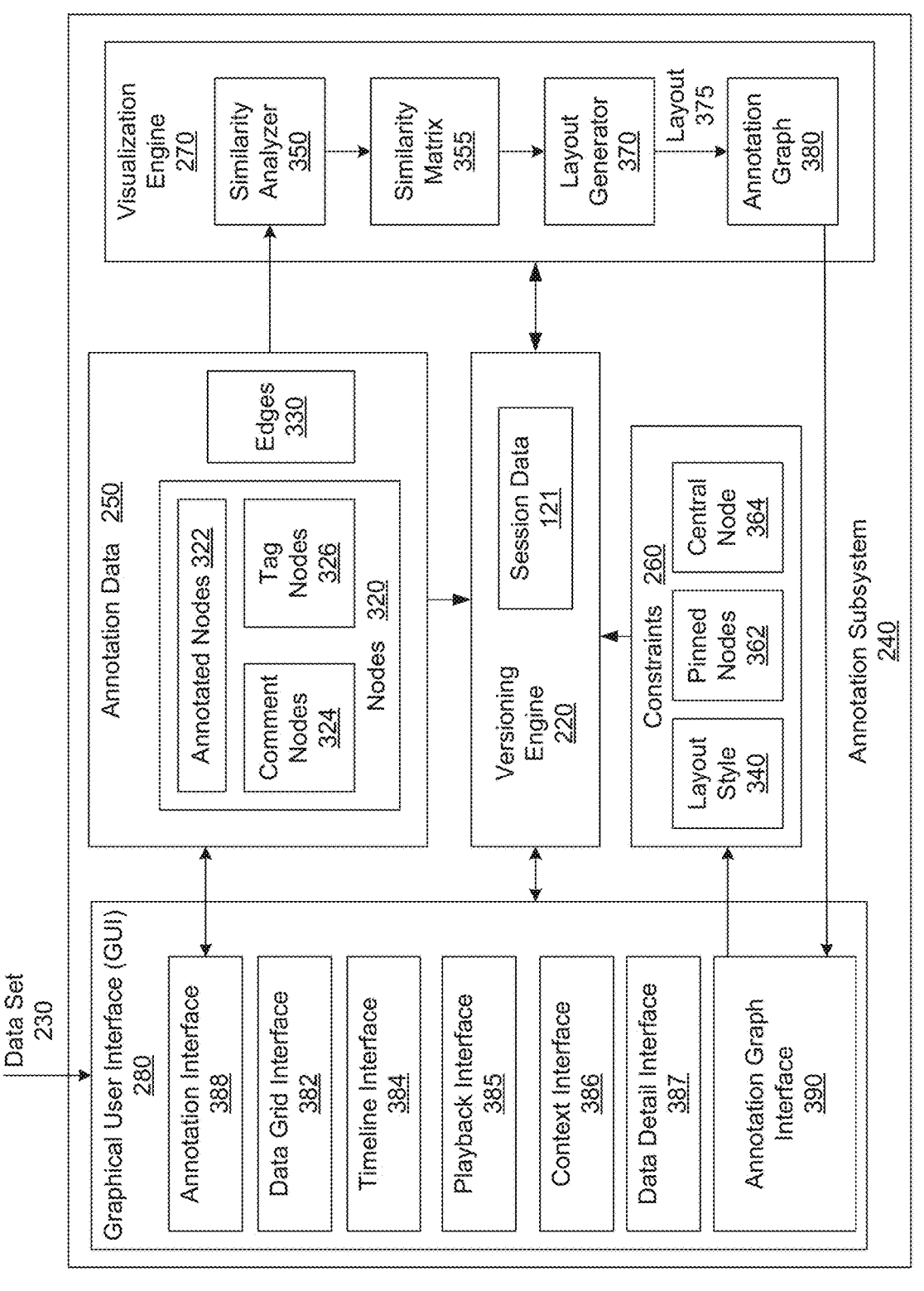
FIG. 3 is a more detailed illustration of the annotation subsystem of FIG. 2, according to various embodiments of the present invention.

FIG. 3 is a more detailed illustration of the annotation subsystem 240 of FIG. 2, according to various embodiments of the present invention. As shown, GUI 280 includes, without limitation, data grid interface 382, timeline interface 384, playback interface 385, context interface 386, data detail interface 387, annotation interface 388, and annotation graph interface 390. In alternate embodiments, GUI 280 may include any number and type of interfaces. For instance, in some embodiments, GUI 280 may include multiple different context interfaces 386.

For data set 230, annotation subsystem 240 generates and renders for display, without limitation, any number of a table view via data grid interface 382, a timeline view via timeline interface 384, and a context view via context interface 386. In alternative embodiments, annotation subsystem 240 generates and renders for display any number of table view via data grid interface, a playback view via playback interface 385, and a detailed view via data detail interface 387. For annotation data 250, annotation subsystem 240 generates and renders for display, without limitation, any amount of annotation data 250 via annotation interface 388 and annotation graph 380 via annotation graph interface 390. Annotation subsystem 340 may configure any number of data grid interface 382, timeline interface 384, playback interface 385, context interface 386, data detail interface 387, annotation interface 388, and annotation graph interface 390 to interact in any technically-feasible fashion. For instance, in some embodiments, if a user selects a data item via data grid interface 382, then annotation subsystem 384 configures playback interface 385, data detail interface 387, and/or annotation interface 388 to highlight the selected data item.

Together, data grid interface 382, playback interface 385, data detail interface 387, and annotation interface 388 enable the user to select and view data items included in data set 230 and replay timeline steps included in session data 121. Since the data items may be organized in any manner and across any number of hierarchical levels, data grid interface 382, playback interface 385, data detail interface 387, and annotation interface 388 may be configured to operate across any number of hierarchy levels in any technically-feasible fashion.

In general, data grid interface 382 reveals a logical structure of data set 230 via a visualization of a table, and enables the user to select data items across rows and columns included in the table. In some embodiments, data grid interface 382 may include a set of references included in data set 230, with each reference being included in data set 230 as a separate data item. Versioning engine 220 may track data associated with the reference, including name, date created, type, relevance score, reference edges added to annotation graph 380, reference nodes added to annotation graph 380, and the number of times a user visits the reference during a session. In some embodiments, a user selecting a data item in data grid interface 382 displays the data item in data detail interface 387 and displays the selection of the data item in playback interface 385.

Timeline interface 384 reveals a temporal structure of user actions performed while interacting with data set 230 via a visualization of a timeline. Context interface 386 reveals information associated with one or more items in data set 230 in a contextually-relevant fashion. For example, context interface 386 could reveal a spatial structure associated with data set 230 via a 3D graph or a heat map of data set 230.

Playback interface 385 also includes user-selectable playback buttons and/or timeline steps. In such instances, selecting the playback button or timeline step causes annotation graph 380 to change, the nodes, annotations, and visualization that were components of annotation graph 380 corresponding to the layout 375 when the selected timeline step was performed. In some embodiments, data grid interface 382 may highlight the selected reference within a table and data detail interface 387 may display the selected reference and highlight portions of reference relevant to a selected timeline step. One or more of data grid interface 382, playback interface 385, and/or data detail interface 387 indicates which of the data items from data set 230 are selected, as well as which of the data items are associated with annotations. As described previously herein, a data item that is associated with one or more annotations is also referred to herein as an annotated data item.

Data detail interface 387 displays the text, graphics, or other media associated with a reference selected via data grid interface 382. In some embodiments, keywords and/or other portions of the reference may be highlighted when an associated node is selected in annotation graph 380 or step selected in playback interface 384. Similarly, keywords entered in data grid interface 382 may be highlighted in portions of the reference shown in data detail interface 387.

As shown, annotation data 250 includes, without limitation, nodes 320 and edges 330. Nodes 320 and edges 330 are included in annotation graph 380. Each node 320 is associated with a position in a layout 375 of annotation graph 380, an annotated data item or an annotation, and one or more of edges 330. Annotation subsystem 340 supports two types of annotations and three types of the nodes 320. In alternate embodiments, annotation subsystem 240 may support any number of types of annotations and any number of types of the nodes 320. Each annotation comprises either a comment that is unstructured text or a tag that is a single word.

The type of each of nodes 320 is one of "annotated," "comment," or "tag." If a given node 320 is associated with an annotated data item, such as a portion of a reference or an entire reference, then the type of the node 320 is annotated, and node 320 is also referred to herein as annotated node 322. If a given node 320 is associated with a comment, then the type of node 320 is comment, and node 320 is also referred to herein as a comment node 324. If a given node 320 is associated with a tag, then the type of node 320 is tag, and node 320 is also referred to herein as a tag node 326.

Each of the edges 330 represents a "between-type" connection between one of nodes 320 of one type and one of nodes 320 of a different type. More specifically, a given edge 330 represents a connection between one of annotated nodes 322 and one of comment nodes 324, one of annotated nodes 322 and one of tag nodes 326, or one of comment nodes 324 and one of tag nodes 326. In alternate embodiments, edges 330 may represent connections between any number and types of the nodes 330 in any technically-feasible fashion.

Annotation interface 388 enables a user to view, select, create, and modify annotation data 250. Annotation interface 388 may include any number and type of interface widgets and may support text-based as well as graphics-based interaction with annotation data 250. Upon receiving a new comment that is associated with a data item via annotation interface 388, annotation subsystem 240 generates a new comment node 324 based on the comment. If associated annotated node 322 does not exist, then annotation subsystem 240 generates associated annotated node 322. Annotation subsystem 240 then generates edge 330 between new comment node 324 and associated annotated node 322. Finally, if the comment is also associated with tag(s), then annotation subsystem 240 generates edge 330 between new comment node 324 and associated tag node(s) 326.

Similarly, upon receiving a new tag that is associated with a data item via annotation interface 388, annotation subsystem 240 generates new tag node 326 based on the tag. If associated annotated node 322 does not exist, then annotation subsystem 240 generates associated annotated node 322. Annotation subsystem 240 then generates edge 330 between new tag node 326 and associated annotated node 322. Finally, if the tag is also associated with comment(s), then annotation subsystem 240 generates edge 330 between new tag node 326 and associated comment node(s) 324.

In various embodiments, annotation subsystem 240 may coordinate any number of automated interactions between annotation interface 388 and any number of other interfaces. For instance, in some embodiments, if a data item is selected in data grid interface 382 or a timeline step is selected in playback interface 385, annotation subsystem 240 automatically configures annotation interface 388 to represent the selected data item and any associated annotations. In a complementary fashion, if an annotation is created via annotation interface 388, then annotation subsystem 240 highlights the associated data item in the data grid interface 382, the associated timeline step in playback interface 385, and a portion of the associated data item in data detail interface 387.

Annotation graph interface 390 facilitates continuous visualization and exploration of the annotation semantics that are generated via annotation interface 388 in the context of data set 230. In operation, visualization engine 270 renders annotation graph 380 for display. Annotation graph interface 390 then displays annotation graph 380 that visually depicts annotation data 250. In some embodiments, annotation graph interface 390 enables the user to define and interact with constraints 260 that influence layout 375 of annotation graph 380. In alternative embodiments, annotation graph interface 390 enables the user to directly move nodes 320 and/or edges 330 to directly modify layout 375 of annotation graph 380. As part of displaying annotation graph 380, annotation graph interface 390 visually depicts various characteristics of nodes 320 and edges 330 included in annotation graph 380. For example, in some embodiments, annotation graph interface 390 depicts annotated nodes 322 in one color, comment nodes 324 in a second color, and tag nodes 326 in a third color. Further, in various embodiments, annotation graph interface 390 depicts each of nodes 320 as a circle, where the size of the circle corresponds to the number of edges 330 that are associated with node 320.

As shown, constraints 260 include, without limitation, layout style 340, pinned nodes 362, and central node 364. In some embodiments, a user can use one or more of constraints 260 to modify layout 375 of annotation graph 380. Layout style 340 defines a general layout scheme that a user may adopt to influence the organization and appearance of annotation graph 380. Each of pinned nodes 362 specifies a fixed position for one of nodes 320, and the user may specify any number of pinned nodes 362. For explanatory purposes only, the set of nodes 320 that are not specified as pinned nodes 362 are referred to herein as "unpinned" nodes 20. Central node 364 specifies that one of nodes 320 is a central node of interest. For explanatory purposes only, nodes 320 that are not specified as central node 364 are referred to herein as "non-central" nodes 320.

In operation, as annotation subsystem 340 updates annotation data 250 and/or constraints 260 based on the user input, annotation subsystem 240 configures visualization engine 270 to automatically (re)generate annotation graph 380. In this fashion, annotation subsystem 240 supports a mixed-initiative approach to graphically depicting annotation data 250 in which the automatically-generated annotation graph 380 reflects user input.

As shown, visualization engine 270 includes, without limitation, similarity analyzer 350, similarity matrix 355, layout generator 370, and annotation graph 380. Similarity analyzer 350 computes similarity matrix 355 based on annotation data 250. Subsequently, layout generator 370 generates layout 375 of annotation graph 380 based on similarity matrix 355 and constraints 260. In some embodiments, layout generator 370 receives manual user input of a layout to generate layout 375. Finally, visualization subsystem 260 generates annotation graph 380 based on layout 375 and the relationships between nodes 320 and edges 330.

In some embodiments, upon receiving new annotation data 250, similarity analyzer 350 computes pairwise similarities between nodes 320 to generate similarity matrix 355. Similarity analyzer 350 computes the pairwise similarities based on both between-type similarities and within-type similarities. In alternate embodiments, similarity analyzer 250 may compute the pairwise similarities in any technically-feasible fashion and based on any technically-feasible criteria. For example, in some alternate embodiments, annotation subsystem 240 may support only one data type, and similarity analyzer 350 may compute pairwise similarities based on only the within-type similarities.

In some embodiments, similarity analyzer 350 computes between-type similarities between pairs comprising one of annotated nodes 322 and one of comment nodes 324, pairs comprising one of annotated nodes 322 and one of tag nodes 326, and pairs comprising one of comment nodes 324 and one of tag nodes 326. By contrast, similarity analyzer 350 computes within-type similarities between pairs of annotated nodes 322, pairs of comment nodes 324, and pairs of tag nodes 326 based on type-specific algorithms.

In general, when visualization engine 270 automatically generates layout 375, similarity analyzer 340 computes between-type similarities based on edges 330. More specifically, if a pair of nodes 320 of different types is connected via one of edges 330, then similarity analyzer 350 sets the corresponding between-type similarity to a between-type similarity constant. By contrast, if a pair of nodes 320 of different types is not connected via any of edges 340, then similarity analyzer 350 sets the between-type similarity of zero. Similarity analyzer 340 may determine the between-type similarity constant in any technically-feasible fashion. For example, in some embodiments, GUI 280 may enable the user to define the between-type similarity constant. In another example, in other embodiments, the between-type similarity constant may be predefined as 0.7. In alternate embodiments, similarity analyzer 350 may compute the between-type similarities in any technically-feasible fashion.

Similarity analyzer 350 computes the within-type similarities between pairs of annotated nodes 322 based on a weighted aggregation of at least one of a selected row overlap, a selected column overlap, and a selected time interval overlap between two annotated nodes 322. For example, similarity analyzer 350 could compute the within-type similarities between a pair of annotated nodes 322 as "A*selectedRowOverlap+B*selectedColumnOverlap+ C*SelectedTimeIntervalOverlap." As referred to herein, A, B, and C are weights. Similarity analyzer 350 may determine the weights in any technically-feasible fashion. For example, GUI 280 could enable the user to define different weights for the selected row overlap, the selected column overlap, and the selected time overlap. In alternate embodiments, similarity analyzer 350 may compute the within-type similarities between pairs of the annotated nodes 322 in any technically-feasible fashion.

Similarity analyzer 350 computes the within-type similarities between pairs of the comment nodes 324 based on a bags-of-words model. In the bag-of-words model, each comment is represented as a vector of frequencies of the words included in the comment. For example, similarity analyzer 350 could compute within-type similarities between comment node 322(x) and comment node 322(y) as "cos(BoWx , BoWy)." As referred to herein, BoWx is a bag-of-words transformation applied to comment node 322 (x), and BoWy is a bag-of-words transformation applied to comment node 322(y). In alternate embodiments, similarity analyzer 350 may compute the within-type similarities between pairs of comment nodes 324 in any technically-feasible fashion.

Similarity analyzer 350 computes the within-type similarities between pairs of tag nodes 326 based on at least one of word semantic meanings, characters, and co-occurrences in comments. For example, similarity analyzer 350 could compute the within-type similarities between the tag node 226(x) and the tag node 226(y) as a weighted aggregation: "J*cos(Vecx, Vecy)+K*ch(326(x), 326(y))+L*Co(326(x), 326(y))." As referred to herein, Vecx is a transformation of tag node 326 to a corresponding vector representation, and Vecy is a transformation of tag node 326(y) to a corresponding vector representation. The factor, "ch(326(x), 326(y))" is a similarity between tag nodes 326(x) and 326(y) based on a Dice's coefficient of bi-gram character sets associated with the tag nodes 326(x) and 326(y). The factor "Co(326(x), 326(y))" represents normalized co-occurrences of the tags associated with the tag nodes 326(x) and 326(y) within the comments associated with comment nodes 324. Finally, J, K, and L represent weights, and similarity analyzer 340 may determine the weights in any technically-feasible fashion. In alternate embodiments, similarity analyzer 350 may compute the within-type similarities between pairs of tag nodes 326 in any technically-feasible fashion.

Notably, if annotation data 250 (including, without limitation, the selected data items, the annotations, nodes 320, and edges 330) changes, then similarity analyzer 350 regenerates similarity matrix 355. However, if constraints 260 change, then similarity analyzer 350 does not necessarily regenerate similarity matrix 344. More specifically, if constraints 260 change but annotation data 250 does not change, then similarity analyzer 350 does not regenerate similarity matrix 355.

Layout generator 370 generates layout 375 of annotation graph 380 based on, without limitation, similarity matrix 355 and constraints 260. Accordingly, as annotation data 250 and/or constraints 260 change, layout generator 370 regenerates layout 375. In alternate embodiments, layout generator 370 may execute any number and type of layout algorithms based on any number and combination of the constraints 260. In other embodiments, layout generator 370 generates layout 375 of annotation graph 380 based on manual user placement of nodes 320 and edges 330.

Versioning engine 220 determines each user action taken via GUI 280 and each corresponding update to annotation data 250, constraints 260, and visualization engine 270. Versioning engine 220 saves each user action as session data 121. Session data 121 includes data and actions generated by annotation data 250, visualization engine 270, constraints 260, and/or GUI 280. Each user action and corresponding update to associated annotation data, visualization data, and/or contextual data may be referred to herein as a "timeline step" and versioning engine 220 stores each timeline step in session data 121 as a distinct state of annotation subsystem 240. In some embodiments, annotation subsystem 240 may illustrate each timeline step in playback interface 385. In some embodiments, the user can replay each of the timeline steps stored in session data 121 via a playback control interface within playback interface 385. As will be discussed in further detail below, in some embodiments, the user can select a specific timeline step to illustrate in one or more interfaces 382-390 of GUI 280 by selecting a timeline step illustrated in a timeline step interface within playback interface 385, or a position along a timeline slider within playback interface 385.

When a user selects a timeline step from session data 121 via playback interface 385, one or more of data grid interface 382, data detail interface 387, annotation interface 388, and/or annotation graph interface 390 retrieves the associated data corresponding to the selected timeline step and present the associated data in one or more interfaces 382-390. For example, the user selecting an "add node" step in playback interface 385 causes visualization engine 270 to display annotation graph 380 using a layout 375 that corresponds to the layout 375 saved during the previous session when versioning engine 220 recorded the "add node" timeline step. Similarly, data grid interface 382 and data detail interface 387 highlight the selected reference and portions of the selected reference that were highlighted when versioning engine 220 recorded the "add node" timeline step. In some embodiments, session data 121 can store user actions that do not update annotation graph 380. For example, versioning engine 220 can store a user submitting a search term, a selecting a reference in data grid interface 382, and a user highlighting of a portion of a selected reference in data detail interface 387 as distinct timeline steps.

Exemplary GUI and Annotation Graphs

Figure 4A:
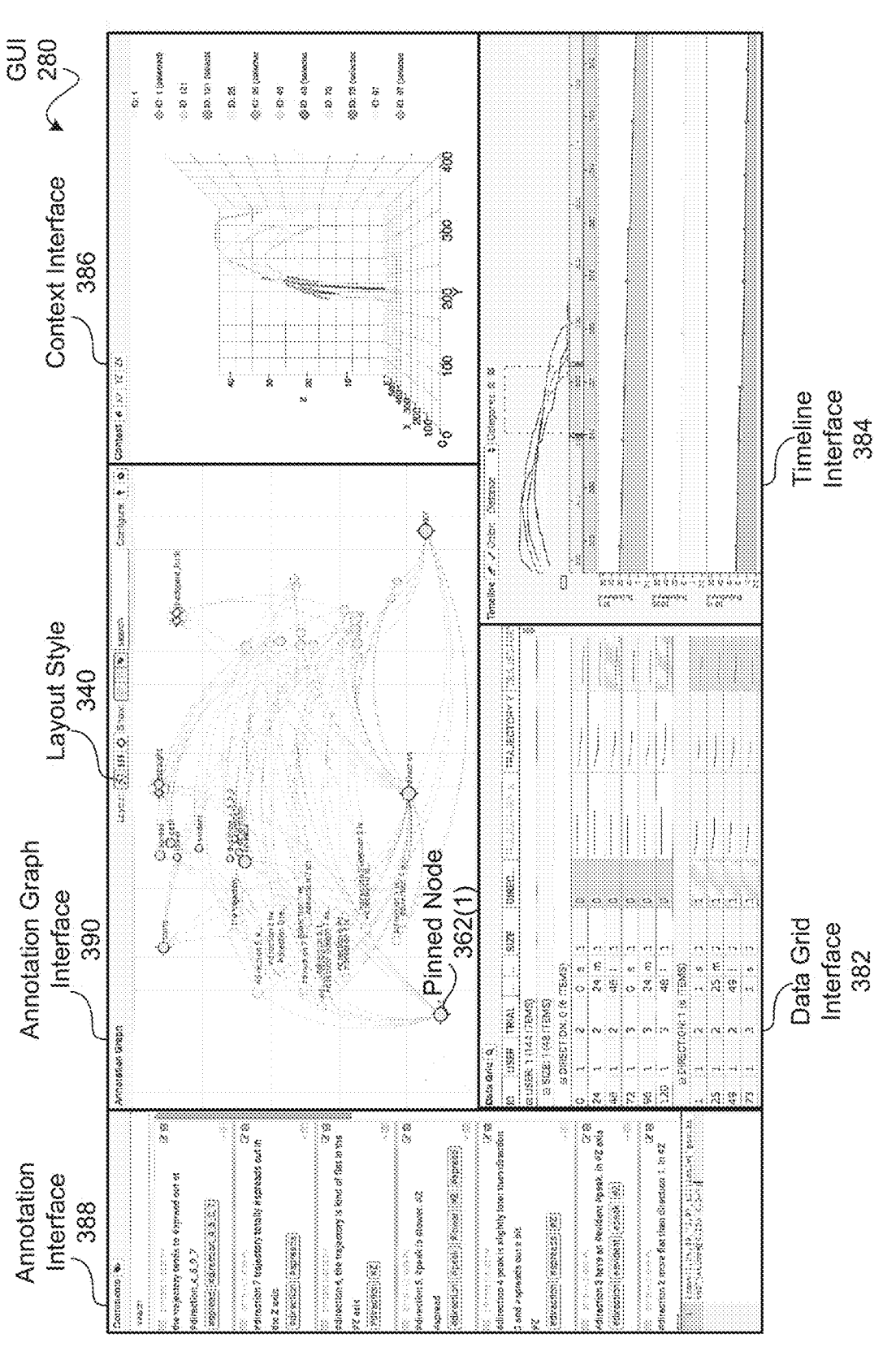
FIG. 4A-4B illustrates examples of the graphical user interface of FIG. 2, according to various embodiments of the present invention.
Figure 4B:
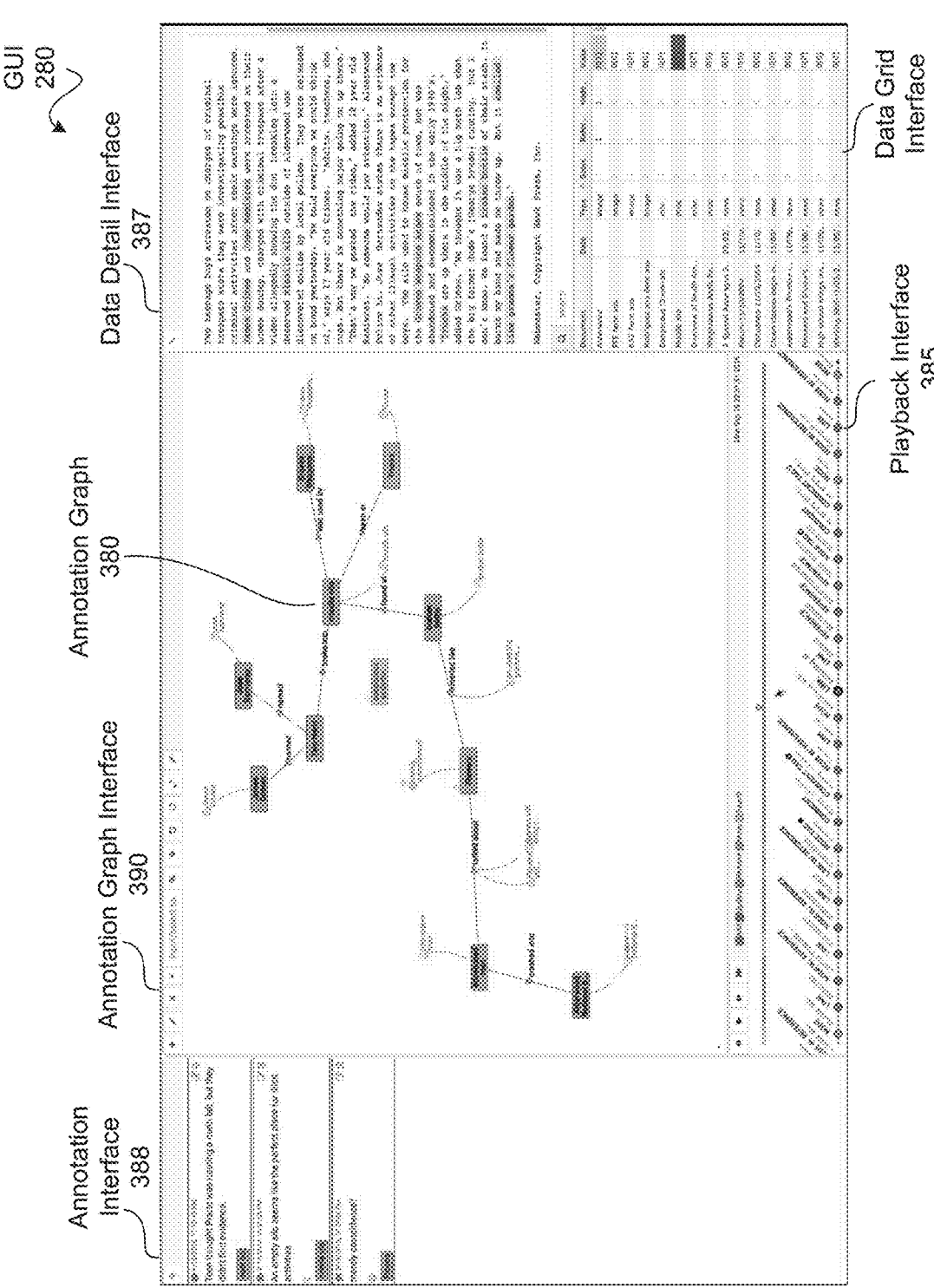

FIG. 4A-4B illustrates examples of the graphical user interface of FIG. 2, according to various embodiments of the present invention. FIG. 4A depicts an appearance of GUI 280 on display device 214 illustrating portions of data set 230. As shown, FIG. 4A depicts data grid interface 382, timeline interface 384, context interface 386, annotation interface 388, and annotation graph interface 390.

Data grid interface 382, timeline interface 384, and context interface 386 display the data items included in data set 230 and indicate which of the data items are selected. Further, data grid interface 382, timeline interface 384, and context interface 386 indicate which of the data items are associated with annotation(s) and, consequently, correspond to annotated nodes 322. For explanatory purposes only, in the context of FIG. 4A, data set 230 includes data items at a top hierarchical level that comprise observation records in an experimental study. For each observation record, data set 230 also includes data items at lower hierarchical levels that comprise attributes (e.g., experimental condition, observed action, etc.) associated with the observation record.

As shown, data grid interface 382 displays the data items as a table. In the example depicted, each row in the table represents a different observation record, while each column represents a different attribute of the record. Entries in the table may represent any type of data item in any technically-feasible fashion. For example, a given entry may be a numerical value, a categorical value, an ordinal value, a textual value, an entire time-series that include continuous values and discrete events, or any other technically-feasible construct.

Timeline interface 384 displays time-series data associated with user actions from the current sense-making session and any previous sense-making sessions. Timeline interface 384 displays the time-series data items that are selected in data gird interface 382. A top portion of the timeline interface 384 displays superimposed details of the selected time-series data items and a selected time interval. In a complementary fashion, a bottom portion of timeline interface 384 displays a juxtaposed detail view of each of the selected time-series data items across the selected time interval.

Context interface 386 depicts visual elements associated with data items selected in data grid interface 382. In alternate embodiments, context interface 386 depicts a 3D view of trajectories that are associated with the data items that are selected in data grid interface 382. In some embodiments, context interface 386 may be customized to reveal the spatial structure of data set 230 in any context and in any technically-feasible fashion. For example, context interface 386 could depict a heat map of gestures that are associated with selected data items.

Together, data grid interface 382, timeline interface 384, and context interface 386 facilitate efficient and detailed exploration of data set 230. In particular, data grid interface 382, timeline interface 384, and context interface 386 enable the user to select data items as part of detecting features and patterns of interest. Further, data grid interface 382, timeline interface 384, and context interface 386 enable the user to efficiently isolate and compare regions of data set 230 at different levels of granularity and across different structural characteristics. For example, a user could select observations records in data grid interface 382 based on a task repetition number and then interact with timeline interface 384 and context interface 386 to investigate potential learning effects in a study.

Annotation interface 388 enables the user to view, select, create, and modify the annotation data 250. As shown, a top portion of annotation interface 388 enables the user to create, view, and modify comments and tags that are associated with, respectively, comment nodes 324 and the tag nodes 326. In addition, the top portion of annotation interface 388 enables the user to associate any number of tags and comments with selected data items. A bottom portion of annotation interface 388 enables the user to select data items for annotation purposes in a text-based fashion via a text-based notation. Annotation interface 388 may support any type of text-based notation in any technically-feasible fashion. In a complementary fashion, data grid interface 382 and timeline interface 384 enable the user to select data items for annotation purposes in a graphics-based fashion. In general, as annotation subsystem 240 receives annotation data 250 via annotation interface 388, annotation subsystem 240 (re)generates the annotation graph 380.

As shown, annotation graph interface 390 displays annotation graph 380 that graphically depicts the dynamic relationships between the annotated data items, comments, and tags. As also shown, annotation graph interface 390 supports selection of the annotation data 250 and enables the user to influence annotation graph 380 via constraints 260. In particular, the user may select layout style 340 via a layout-style interface widget that is situated in a center of a top portion of annotation graph interface 390. In the illustrative embodiment, for example, the layout-style interface widget visually depicts three available layout styles 340. In various embodiments, the menu may include any number and type of other features and widgets that facilitate interactions with annotation graph 380 and constraints 260. For example, the menu may include a search widget.

In addition to configuring layout style 340 via the menu, the user may create, modify, and/or delete any number and type of other constraints 260 via displayed annotation graph 380. To create pinned node 362(1), the user manually moves a given node 320 to a desired position and specifies that node 320 is fixed to the position. To create central node 364, the user selects node 320 of interest and specifies that selected node 320 is central node 364.

Advantageously, by interacting with different interfaces included in GUI 280, the user can efficiently perform sense-making operations based on annotation data 250 in the context of data set 230. For instance, in one exemplary workflow, the user could conceive an initial question with vague goals. As part of answering the initial question, the user could examine data set 230 via data grid interface 382, timeline interface 384, and context interface 386. The user could then generate annotation data 250 via annotation interface 388 to reflect interesting observations. As the user enters annotation data 250, the user could view annotation graph 380 via annotation graph interface 390 and modify constraints 260 to explore annotation data 250 and generate explanations for the observations and an answer to the initial question.

FIG. 4B illustrates an example of the graphical user interface (GUI) 280 of FIG. 2, according to various embodiments of the present invention. In particular, FIG. 4B depicts an appearance of GUI 280 on display device 214 that includes session data 121 provided by versioning engine 220. GUI 280 includes a playback interface 385 that displays timeline steps from session data 121. As shown, FIG. 4B depicts data grid interface 382, playback interface 385, data detail interface 387, annotation interface 388, and annotation graph interface 390.

In some embodiments, data grid interface 382, playback interface 385, data detail interface 387, annotation interface 388, and annotation graph interface 390 display data items included in data set 230 based on a specific timeline step. In some embodiments, annotation subsystem 240 may play a sequence of timeline steps and update each of interfaces 382, 385, 387, 388, 390 based on the timeline step annotation subsystem 240 plays. Depending on the timeline step annotation subsystem 240 illustrates, one or more of interfaces 382, 385, 387, 388, 390 may remain static, while one or more of the remaining interfaces 382, 385, 387, 388, 390 may update to display associated data to correspond to the timeline step annotation subsystem 240 plays.

In some embodiments, data grid interface 382 may include a list of references included in data set 230, along with information associated with the references included in the list. For example, data grid interface 382 displays a name, date created, type, relevance score, reference edges added to annotation graph 380, reference nodes added to annotation graph 380, and the number of times a user visits the reference during a session. In some embodiments, data gird interface 382 also includes a search field that enables a user to perform keyword searches and similar text searches on the references included in data set 230. When a user performs a keyword search, each line of references included in data grid interface 382 may be updated with a relevance score based on potential matches to the criteria of the keyword search.

Data detail interface 387 displays a reference in data set 230. In some embodiments, data detail interface 387 displays a reference selected by the user via data grid interface 382. In some embodiments, data detail interface 387 can display a portion of the reference, or, alternatively, the entire reference. Data detail interface 387 displaying a reference enables a user to review the reference for potential information that the user can add to annotation interface 388 and/or annotation map 380. For example, a user may add tag node 326 to annotation map 380 that attaches portions of the reference to tag node 326. When a user selects the timeline step in playback interface 385 corresponding to annotation subsystem 240 adding tag node 326 to annotation map 380, or when a user selects tag node 326 in annotation graph interface 390, data detail interface 387 displays the reference while highlighting the portion of the reference attached to tag node 326. In some embodiments, a user may add a tag node 326 that has the entire reference attached to the tag node 326.

Playback interface 385 displays timeline steps associated with user actions performed during a sense-making session. Playback interface 385 displays timeline events associated with user actions from the current sense-making session. In some embodiments, annotation subsystem 240 retrieves the timeline steps from session data 121 saved by versioning engine 220. In some embodiments, versioning engine 220 may retrieve session data 121 from server 101 and annotation subsystem 240 may display each of the user actions from session data 121 as timeline steps in playback interface 385. The timeline steps from session data 121 are associated with one or more previous sense-making sessions. A user may interact with one or more timeline steps included in playback interface 385 see previous states of interfaces 382, 385, 387, 388, 390 as they were when the user performed the action associated with the timeline step.

For example, a user can use playback controls included in playback interface 385 to playback a sequence of timeline steps. Playback of the sequence of timeline steps causes annotation subsystem 240 to animate one or more interfaces 382-390 to reflect what was displayed in each interface 382, 385, 387, 388, 390 when each timeline step was performed. For example, when annotation subsystem 240 performs a playback of a sequence of timeline steps consisting of a user adding multiple nodes 320 to annotation graph 380, annotation subsystem 240 highlights each timeline step as it is illustrated by GUI 280. Annotation subsystem 240 also animates a annotation graph 380 to include the added tag 320, while also animating annotation graph 380 to reflect the new layout 375 that visualization engine 270 uses to reflect the additional tag 240. In some embodiments, annotation subsystem 240 also updates data grid interface 382, context interface 386, and/or annotation interface 388 to display the data items that were displayed when the timeline step occurred.

Advantageously, updating each of the displays enables the annotation subsystem 240 to display to a user of the current sense-making session all the information available to the user of the previous sense-making session when the user performed the user action associated with the timeline step. Displaying the associated information in data set 230 the user was accessing at the time of a timeline step enables users in subsequent sessions to better understand the strategy, thought process, and provenance of the user when the user was performing operations during the previous sense-making session.

Figure 5:
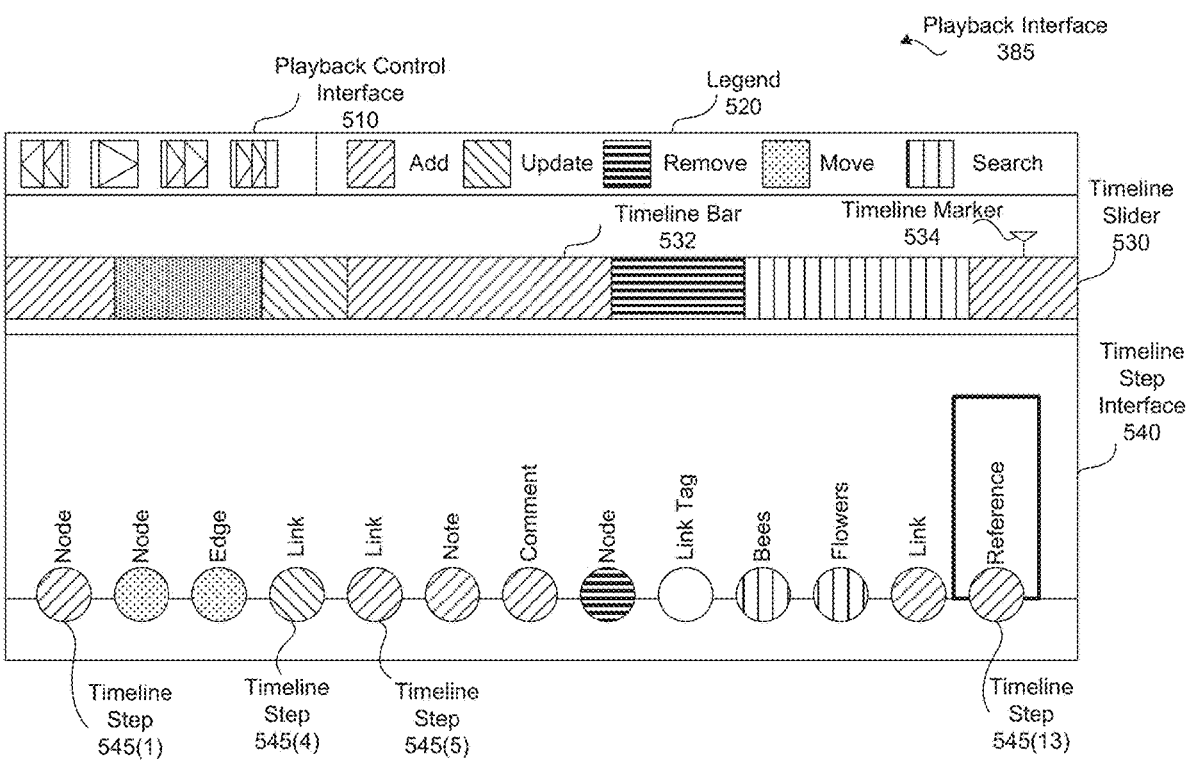
FIG. 5 illustrations an example playback interface of the graphical interface of FIG. 2, according to various embodiments of the present invention.

FIG. 5 illustrates an example playback interface 385 of the graphical interface 280 of FIG. 2, according to various embodiments of the present invention. More precisely, FIG. 5 depicts an appearance of playback interface 385 in GUI 280 on display device 214 that includes multiple timeline steps saved by versioning engine 220 as session data 121. As shown, playback interface 385 depicts playback control interface 510, legend 520, timeline slider 530, and timeline step interface 540. Playback interface 385 includes timeline steps 545(1)-(13) associated with user actions taken during a sense-making session. In some embodiments, playback interface 385 may include one or more sequences of timeline steps 645 that were generated in a previous sense-making session and retrieved from session data 121.

Playback control interface 510 includes one or more playback buttons that enable the user to watch a sequence of timeline steps 545. In some embodiments, playback interface 510 includes buttons associated with indicating playback, rewind, and fast-forward commands. Annotation subsystem 240 receives a command via playback control interface 510 displays progression of annotation data 250, annotation graph 380, and data set 230 as animations, where annotation subsystem 240 smoothly transitions between timeline steps 645(1)-645(13) by illustrating transitions to include annotation data 250, adding and removing nodes 320 in annotation graph 380 and annotation interface 388, and modifying layout 375 of annotation graph 380. In some embodiments, annotation subsystem 240 illustrates transitions between layous 375, such as a transition where a user moved an unpinned node 320. In some embodiments, playback control interface 510 also includes step playback buttons that indicate playback commands where annotation subsystem 240 transitions backwards or forwards one timeline step 545 in a sequence of timeline steps 645, such as from timeline step 545(4) to timeline step 545(5).

Timeline slider 530 displays a time-scale recreation of user actions taken during a session of sense-making operations while working on data set 230. Timeline slider 530 includes timeline bar 532 and timeline marker 534. Timeline slider 530 has timeline bar 532 divided separate portions color-coded by type of timeline step 545. For example, legend 520 displays five timeline-step types: add, update, remove, move, and search. Persons skilled in the art would recognize other technically-feasible types of user actions.

In some embodiments, timeline slider 530 is scaled, with the length of timeline slider 530 directly proportional to the duration of all sessions illustrated in timeline step interface 540. In operation, a user can move timeline marker 534 along timeline bar 532 to reach a specific timeline step 545. In such instances, the continual movement of timeline marker 534 along timeline bar 532 provides an indication for annotation subsystem 240 to illustrate each timeline step 545 in a sequence between the starting point and ending point of timeline marker 534. In some embodiments, annotation graph 380, along with one or more interfaces 382, 385, 387, 388, 390 may animate annotation data 250 and/or other data items associated with the intervening timeline steps 645 between a timeline step 545(13) associated with the initial position of timeline marker 534 and a timeline step 545(1) associated with the final position of timeline marker 534.

Timeline step interface 540 includes a sequence of timeline steps 545(1)-(13), with each timeline step 545 associated with a user action performed during a sense-making session. In some embodiments, the sequence of timeline steps 545(1)-(13) includes timeline steps performed during the current sense-making session. Timeline step interface 540 highlights the timeline step 545(13) being displayed by interfaces 382, 385, 387, 388, 390 in GUI 280. In operation, a user can select a specific timeline step 545 to display the state of each of interfaces 382, 385, 387, 388, 390 at the time versioning engine 220 recorded timeline step 545.

Exemplary Sense-Making and Playback Methods

Figure 6:
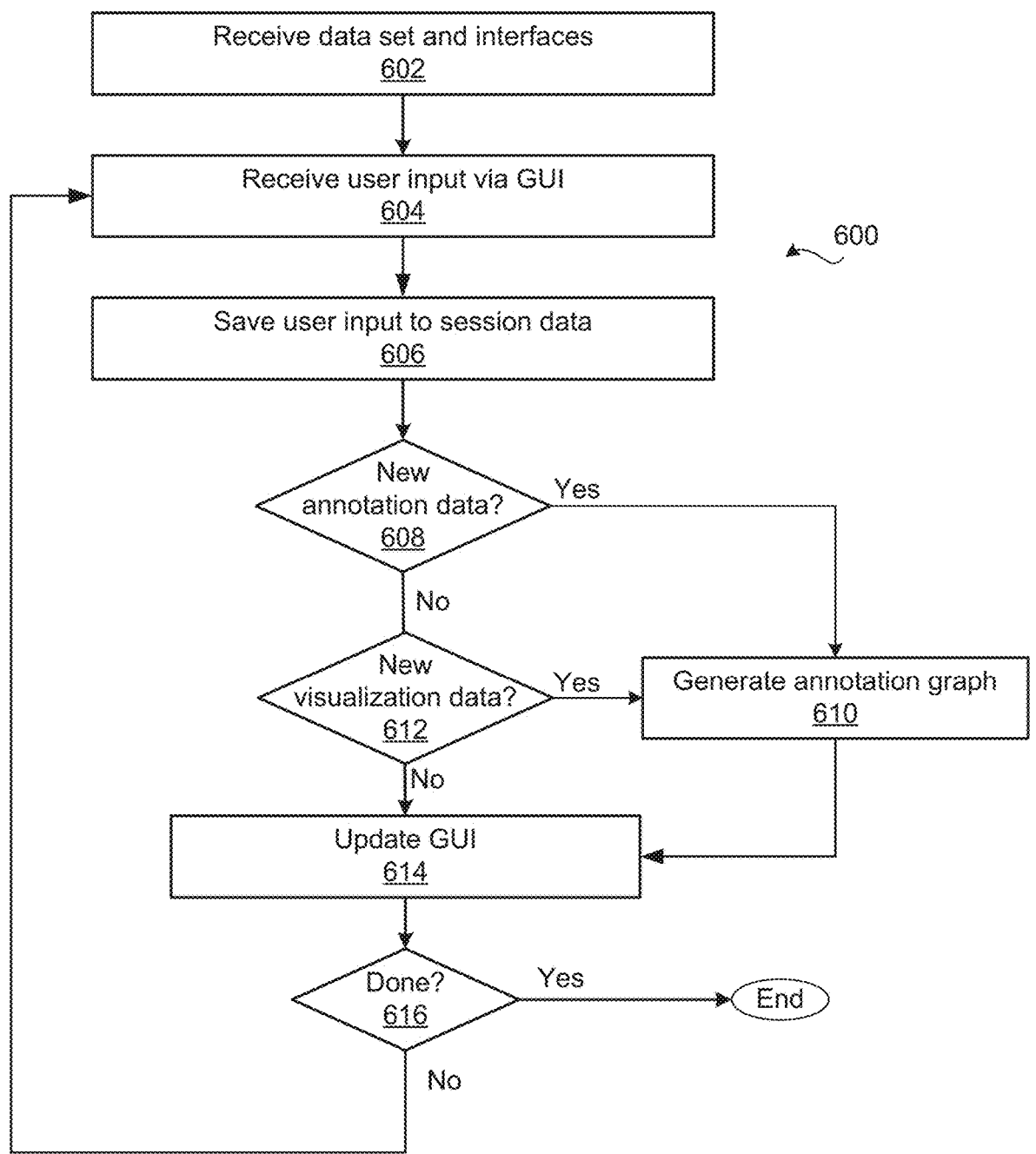
FIG. 6 is a flow diagram of method steps for performing sense-making operations on data sets, according to various embodiments of the present invention.

FIG. 6 is a flow diagram of method steps for performing sense-making operations on data sets, according to various embodiments of the present invention. Although the method steps are described with reference to the systems of FIGS. 1-5, persons skilled in the art will understand that any system configured to implement the method steps, in any order, falls within the scope of the present invention. For explanatory purposes only, the method steps are described in the context of performing sense-making operations on annotated data 250. In alternate embodiments, the method steps may be altered to perform sense-making operations on any data set that may or may not be associated with annotation data 250, and the data set may include any number and type of data items.

As shown, method 600 begins at step 602, where annotation subsystem 240 receives data set 230 and configures GUI 280 to display interfaces 382-390. In some embodiments, annotation subsystem may display interfaces 382, 385, 387, 388, 390 to display portions of data set 230 along with playback controls for timeline steps 545 retrieved from session data 121. At step 604, annotation subsystem 240 receives user input via GUI 280. The user input may involve data set 230, annotation data 250, and/or constraints 260. For example, the user could change the selected data items via annotation interface 388, data grid interface 382, or playback interface 385. Alternatively, the user could change annotation data 250 via annotation interface 388, or constraints 260 and/or layout 375 via annotation graph interface 390. In alternate embodiments, GUI 280 may include any number and type of interfaces, including interfaces 382-390, and GUI 280 may receive any type of user input in any technically-feasible fashion via any of the interfaces.

At step 606, versioning engine 220 saves the user input to session data 121. Versioning engine 220 saves the user input as a timeline step 545 within a set of timeline steps 645 included in session data 121. In some embodiments, versioning engine 220 may also save a set of associated data with timeline step 545. In some embodiments, the set of associated data includes annotation data 250, data items in data set 230, visualization data (including constraints 260, annotation graph 380, and layout 375), and contextual data.

At step 608, annotation subsystem 240 determines whether the user input specifies new annotation data 250. If, at step 608, annotation subsystem 240 determines that the user input specifies new annotation data 250, then method 600 proceeds to step 610. At step 610, visualization engine 270 generates an annotation graph 380 to include the new annotation data 250, and method 600 proceeds directly to step 614.

If, however, at step 608, annotation subsystem 240 determines that the user input does not specify new annotation data 250, then method 600 proceeds directly to step 612. At step 612, annotation subsystem 240 determines whether the user input specifies a new visualization data. In some embodiments, the new visualization data may include movement of a node 320 in annotation graph interface 390. If, at step 612, annotation subsystem 240 determines that the user input specifies new visualization data, then method 600 proceeds to step 614.

At step 614, annotation subsystem 240 updates GUI 280. As part of step 614, annotation subsystem 240 may update any number and combination of annotation interface 388, data grid interface 382, playback interface 385, data detail interface 387, and annotation graph interface 390. In various embodiments, GUI 280 may include any number and type of interfaces and GUI 280 may update any number and combination of the interfaces based on any criteria.

At step 616, annotation subsystem 240 determines whether annotation subsystem 240 is to cease operating. If, at step 616, annotation subsystem 240 determines that annotation subsystem 240 is to cease operating, then method 600 terminates. If, however, at step 616, annotation subsystem 240 determines that annotation subsystem 240 is to continue operating, then method 600 returns to step 604, where annotation subsystem 240 receives new user input via GUI 280.

Annotation subsystem 240 continues to cycle through steps 604-616 until annotation subsystem 240 determines that annotation subsystem 240 is to cease operating. In this fashion, annotation subsystem 240 enables the user to perform sense-making operations on data set 230. Notably, as annotation subsystem 240 operates, versioning engine 220 stores each user action through GUI 280 to effectively record the user's process when performing sense-making operations.

Figure 7:
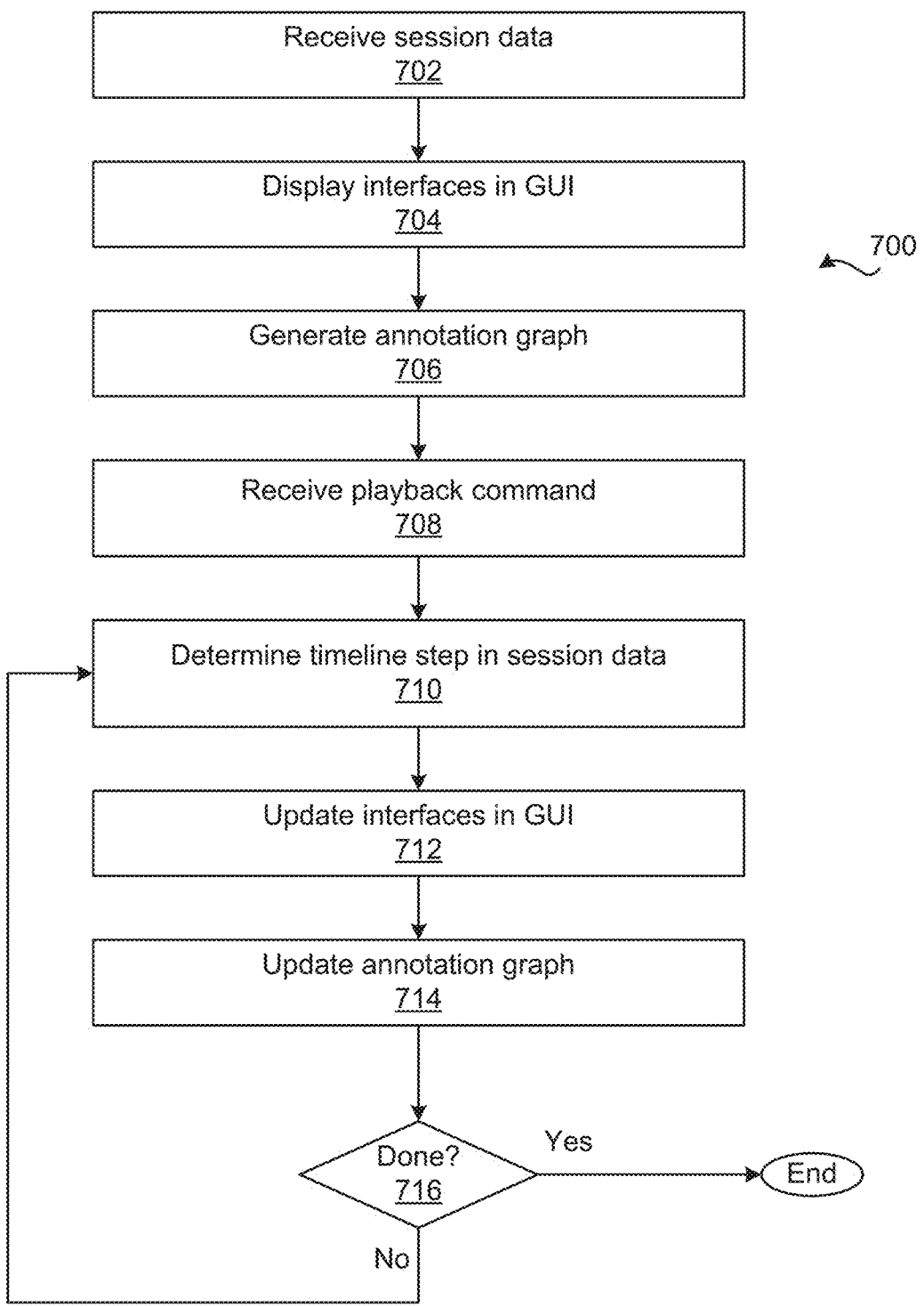
FIG. 7 is a flow diagram of method steps for playing back sense-making operations included in a saved session, according to various embodiments of the present invention.

FIG. 7 is a flow diagram of method steps for performing playback of sense-making operations of a saved session, according to various embodiments of the present invention. Although the method steps are described with reference to the systems of FIGS. 1-5, persons skilled in the art will understand that any system configured to implement the method steps, in any order, falls within the scope of the present invention. For explanatory purposes only, the method steps are described in the context of playing timeline steps 545 from session data 121. In alternate embodiments, the method steps may be altered to play timeline steps corresponding to any data set that may or may not be associated with session data 121, and the data set may include any a number and type of data items.

As shown, method 700 begins at step 702, where annotation subsystem 240 receives session data 121. In some embodiments, versioning engine 220 may receive session data 121 from server 101 via communications network 107 when annotation subsystem 240 receives data set 230 from server 101. In some embodiments, versioning engine 220 may store session data 121 locally in system memory 226. In some embodiments, session data 121 may include sequences of timeline steps 545 from multiple sessions of sense-making operations while one or more uses work on data set 230. In some embodiments, versioning engine 220 may receive multiple files of session data 121. When versioning engine 220 receives multiple files of session data 121, annotation subsystem 240 generates interfaces 382, 385, 387, 388, 390 and annotation graph 380 in GUI 280 to include one or more timeline steps 545 from one or more of the multiple files of session data 121.

At step 704, annotation subsystem 240 displays interfaces 382, 385, 387, 388, 390 in GUI 280. In some embodiments, annotation subsystem 240 displays data items from data set 230 corresponding to the most recent timeline step 545 included in session data 121. At step 706, annotation subsystem 240 generates annotation graph 380 in annotation graph interface 390. In some embodiments, annotation subsystem 240 illustrates annotation graph 380 that corresponds with the most recent timeline step 545(13) included in session data 121.

At step 708, annotation subsystem 240 receives a playback command. Annotation subsystem 240 receives a playback command from the user via an action in playback interface 385. The playback command provides an indication for annotation subsystem 240 to play one or more timeline steps 545 in a sequence selected using the playback command. In some embodiments, annotation subsystem 240 receives an indication that the user selected a specific playback button in playback control interface 510. The playback button indicates a sequence of one or more timeline steps 645 for annotation system 240 to play. In some embodiments, annotation subsystem 240 determines that the user is moving timeline marker 534 to a different position along timeline bar 532 in timeline slider 530. In some embodiments, timeline marker 534 provides an indication for annotation subsystem 240 to illustrate a sequence of one or more timeline steps 545. In some embodiments, annotation subsystem 240 determines that the user selected a specific timeline step 545 in timeline step interface 540. In some embodiments, timeline step 545 selected by the user provides an indication for annotation subsystem 240 to a single timeline step 545.

At step 710, annotation subsystem 240 determines a timeline step 545 in session data 121. Annotation subsystem 240 determines a timeline step 545 within a sequence of one or more timeline steps 645 based on the playback command received in step 708. In some embodiments, the annotation subsystem 240 determines a single timeline step 545 selected by the user. For example, if the user selects a playback step button in playback interface 610, or if the user selects a specific position on timeline bar 532, or if the user selects a specific timeline step 545, annotation subsystem 240 determines the single timeline step 545 selected by the user. In alternate embodiments, annotation subsystem 240 determines that the user is selecting playback of a sequence including multiple timeline steps 645, such as by selecting a rewind, playback, or fast-forward button in playback interface 610, or by dragging timeline marker 534 along timeline bar 532. In such instances, annotation subsystem 240 determines timeline step 545 by determining the next timeline step 545 included in the sequence of timeline steps 645 to display.

At step 712, annotation subsystem 240 updates interfaces 382, 385, 387, 388, 390 in GUI 280. As part of step 712, annotation subsystem 240 updates any number and combination of data grid interface 382, playback interface 385, context interface 386, annotation interface 388, and annotation graph interface 390. In various embodiments, GUI 280 may include any number and type of interfaces and GUI 280 may update any number and combination of the interfaces based on any criteria.

At step 714, annotation subsystem 270 updates annotation graph 380 in annotation graph interface 390. Specifically, visualization engine 270 generates annotation graph 380 based on layout 375, nodes 320, and edges 330 corresponding to timeline step 545 determined in step 810. In some embodiments, visualization engine 270 may update layout 375 based on modifications made by a user in adding or removing nodes 320, manually moving nodes 320 within annotation graph 380, and reclassifying nodes (e.g., adding tags to an node to make a tagged node 326). Visualization engine 270 updates annotation graph 380 to display annotation graph 380 as the annotation graph appeared when a user performed the user action associated with the timeline step 545 determined at step 710.

At 716, annotation subsystem 240 determines whether to cease playback. If, at step 716, annotation subsystem 240 determines that it is to cease playback of a single timeline step 545 or a sequence of timeline steps 545, then method 700 terminates. If, however, at step 716, annotation subsystem 240 determines that it is to continue playback of a sequence of timeline steps 545, then method 700 returns to step 710, where annotation subsystem 240 determines the next timeline step 545 in the sequence of timeline steps 545. Annotation subsystem 240 continues to cycle through steps 710-716 until annotation subsystem 240 determines that it is to cease playback of the sequence of timeline steps 545. In this fashion, annotation subsystem 240 enables the user to perform playback on a sequence of timeline steps 545 associated with a sense-making session. Notably, as annotation subsystem 240 operates, the user may view information in various interfaces 382, 385, 387, 388, 390 as it was displayed when a user performed a user action during a previous session of sense-making operations.

In sum, the disclosed techniques may be implemented to record and playback sense-making operations performed in given sessions. In operation, annotation subsystem records as different steps each user action performed within a graphical user interface during a first session and saves the set of steps as session data for that session. During a subsequent session, a user can interact with a timeline interface within the graphical user interface to playback the steps saved in the session data for the first session to view the user actions that resulted in the recorded sequence of steps. The user also can annotate specific user actions during the first session to generate a set of annotation data. The user can further update the set of annotation data with new user actions and additional annotations, which the annotation subsystem records as steps in separate session data for a separate session.

Notably, as the user interacts with the playback tools included in the timeline interface, the GUI replays each of the user actions performed in the previous session. The replay includes updating an annotation graph, layout, context interface, and annotation interface based on the specific saved user action. A user interacts with the timeline interface to see the nodes and annotations added, moved, and updated during the saved session, as well as search terms used and references accessed during the saved session.

Advantageously, the annotation subsystem enables an accurate handoff between collaborators interacting with a common data set in a collaboration environment. In particular, the annotation subsystem provides a user the ability to record sense-making operations as a set of steps during a first session and playback the set of steps during a subsequent session. The annotation system playing back the recorded set of steps enables a user to handoff certain information, like progress and strategy, between sessions of sense-making operations. In particular, the annotation system playing back the recorded set of steps also enables the user to convey strategy and process involved when the user adds annotations the annotation set for the data set. The annotation system displaying references from the data set a user accessed while adding annotations enables the user to provide provenance for annotations included in the annotation set. Unlike conventional revision control systems, the annotation subsystem enables a user to provide handoff in a collaboration environment that involves ill-defined and non-routine goals and tasks.

1. In some embodiments a computer-implemented method for playback of a sense-making operation comprises receiving first session data that includes a set of timeline steps, wherein each timeline step included in the set of timeline steps corresponds to a user action performed on a data set; receiving a playback command to display a first sequence of timeline steps included in the set of timeline steps; and rendering a first graph for display based on at least one timeline step included in the first sequence of timeline steps.

2. The computer-implemented method of clause 1, wherein rendering the first graph for display comprises rendering the first graph for each timeline step included in the first sequence of timeline steps.

3. The computer-implemented method of clauses 1 or 2, which further comprises retrieving a reference from the data set that is associated with the at least one timeline step included in the first sequence of timeline steps; and displaying, after rendering the first graph, the reference simultaneously with the first graph.

4. The computer-implemented method of any of clauses 1-3, which further comprises retrieving a first annotation from an annotation set associated with the data set, wherein the first annotation is associated with the at least one timeline step included in the first sequence of timeline steps; and displaying, after rendering the first graph, the first annotation simultaneously with the first graph.

5. The computer-implemented method of any of clauses 1-4, wherein the first annotation is included in the first graph.

6. The computer-implemented method of any of clauses 1-5, which further comprises retrieving a reference from the data set that is associated with the at least one timeline step included in the first sequence of timeline steps; displaying, after rendering the first graph, the reference simultaneously with the first graph; determining a portion of the reference is associated with the first annotation; and highlighting the portion of the reference when displayed.

7. The computer-implemented method of any of clauses 1-6, which further comprises displaying, after rendering the first graph, the set of timeline steps from the session data simultaneously with the first graph.

8. The computer-implemented method of any of clauses 1-7, which further comprises receiving a first user action performed on the data set; and storing the first user action as an additional timeline step in the set of timeline steps in the first session data.

9. The computer-implemented method of any of clauses 1-8, which further comprises receiving, after rendering the first graph, a second user action performed on the data set; and storing the second user action as a timeline step in a second set of timeline steps that is included in a second session data.

10. In some embodiments, a non-transitory computer-readable storage medium including instructions that, when executed by a processor, cause the processor to playback a sense-making operation by performing the steps of receiving first session data that includes a set of timeline steps, wherein each timeline step included in the set of timeline steps corresponds to a user action performed on a data set; receiving a playback command to display a first sequence of timeline steps included in the set of timeline steps; and rendering a first graph for display based on at least one timeline step included in the first sequence of timeline steps.

11. The non-transitory computer-readable medium of clause 10, wherein receiving the playback command to display a first sequence of timeline steps comprises receiving an indication from a user-selectable button in a playback interface.

12. The non-transitory computer-readable medium of clauses 10 or 11, wherein receiving the playback command to display a first sequence of timeline steps comprises receiving an indication of a movement of a marker along a timeline slider, wherein the timeline slider corresponds to the first sequence of timeline steps.

13. The non-transitory computer-readable medium any of clauses 10-12, wherein receiving the playback command to display a first sequence of timeline steps comprises receiving an indication of a selection of a graphical representation of the at least one timeline step included in the first sequence of timeline steps.

14. The non-transitory computer-readable medium of any of clauses 10-13, wherein rendering the first graph for display comprises rendering the first graph for each timeline step included in the first sequence of timeline steps.

15. The non-transitory computer-readable medium of any of clauses 10-14, which further comprises instructions that, when executed by a processor, cause the processor to further perform the steps of retrieving a reference from the data set that is associated with the at least one timeline step included in the first sequence of timeline steps; and displaying, after rendering the first graph, the reference simultaneously with the first graph.

16. The non-transitory computer-readable medium of any of clauses 10-15, which further comprises instructions that, when executed by a processor, cause the processor to further perform the steps of retrieving a first annotation from an annotation set associated with the data set, wherein the first annotation is associated with the at least one timeline step included in the first sequence of timeline steps; and displaying, after rendering the first graph, the first annotation simultaneously with the first graph.

17. The non-transitory computer-readable medium of any of clauses 10-16, which further comprises instructions that, when executed by a processor, cause the processor to further perform the steps of retrieving a reference from the data set that is associated with the at least one timeline step included in the first sequence of timeline steps; displaying, after rendering the first graph, the reference simultaneously with the first graph; determining a portion of the reference is associated with the first annotation; and highlighting the portion of the reference when displayed.

18. The non-transitory computer-readable medium of any of clauses 10-17, which further comprises instructions that, when executed by a processor, cause the processor to further perform the steps of receiving, after rendering the first graph, a second user action performed on the data set; and storing the second user action as a timeline step in a second set of timeline steps that is included in a second session data.

19. In some embodiments, a system comprises a memory storing instructions; and a processor that is coupled to the memory and, when executing the instructions, is configured to receive first session data that includes a set of timeline steps, wherein each timeline step included in the set of timeline steps corresponds to a user action performed on a data set; receive a playback command to display a first sequence of timeline steps included in the set of timeline steps; and render a first graph for display based on at least one timeline step included in the first sequence of timeline steps.

20. The system of clause 19, wherein the processor is further configured to retrieve a reference from the data set that is associated with the at least one timeline step included in the first sequence of timeline steps; and display, after rendering the first graph, the reference simultaneously with the first graph.

Any and all combinations of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for playback of sense-making operations, the method comprising:

receiving first session data that includes a set of timeline steps, wherein each timeline step included in the set of timeline steps corresponds to a user action performed to annotate data in a data set;

receiving a playback command to display an animation of a first sequence of timeline steps included in the set of timeline steps, wherein the first sequence of timeline steps comprises one or more user actions to directly move a node or an edge of an annotation graph; and generating the animation by, for each timeline step included in the first sequence of timeline steps:

automatically generating a first graph that includes a plurality of nodes based on a saved layout that was used to generate the first graph when the timeline step occurred, wherein the plurality of nodes represent a plurality of user actions for annotating data items, rendering the first graph for display in a first interface that resides within a first portion of a display area, and updating one or more additional interfaces to display one or more references and one or more annotations that were displayed in the one or more additional interfaces when the timeline step occurred, wherein the one or more additional interfaces reside within one or more additional portions of the display area.

2. The computer-implemented method of claim 1, wherein updating the one or more additional interfaces comprises:

retrieving a reference from the data set that is associated with the timeline step; and displaying, after rendering the first graph, the reference simultaneously with the first graph.

3. The computer-implemented method of claim 1, wherein updating the one or more additional interfaces comprises:

retrieving a first annotation from an annotation set associated with the data set, wherein the first annotation is associated with the timeline step; and displaying, after rendering the first graph, the first annotation simultaneously with the first graph.

4. The computer-implemented method of claim 3, wherein the first annotation is included in the first graph.

5. The computer-implemented method of claim 3, further comprising:

retrieving a reference from the data set that is associated with the timeline step;

displaying, after rendering the first graph, the reference simultaneously with the first graph;

determining a portion of the reference is associated with the first annotation; and highlighting the portion of the reference when displayed.

6. The computer-implemented method of claim 1, further comprising:

displaying, after rendering the first graph, the set of timeline steps from the first session data simultaneously with the first graph.

7. The computer-implemented method of claim 1, further comprising:

receiving a first user action performed to annotate data in the data set; and storing the first user action as an additional timeline step in the set of timeline steps in the first session data.

8. The computer-implemented method of claim 1, further comprising:

receiving, after rendering the first graph, a first user action performed to annotate data in the data set; and storing the first user action as a timeline step in a second set of timeline steps that is included in second session data.

9. The computer-implemented method of claim 1, further comprising rendering a timeline for display, wherein the timeline includes the set of timeline steps.

10. The computer-implemented method of claim 1, further comprising, for each timeline step included in the first sequence of timeline steps, updating a second interface to display a structure of the data set that was displayed in the second interface when the timeline step occurred, wherein the second interface resides within a second portion of the display area.

11. The computer-implemented method of claim 10, wherein the first interface, the second interface, and the one or more additional interfaces are included in a graphical user interface.

12. The computer-implemented method of claim 1, wherein the one or more user actions directly move the node and the edge in the annotation graph.

13. The computer-implemented method of claim 1, wherein the annotation graph comprises a plurality of nodes and a plurality of edges, and each of the plurality of edges connects between two different node types in the annotation graph.

14. One or more non-transitory computer-readable storage media including instructions that, when executed by one or more processors, cause the one or more processors to playback sense-making operations by performing the steps of:

receiving first session data that includes a set of timeline steps, wherein each timeline step included in the set of timeline steps corresponds to a user action performed to annotate data in a data set;

receiving a playback command to display an animation of a first sequence of timeline steps included in the set of timeline steps, wherein the first sequence of timeline steps comprises one or more user actions to directly move a node or an edge of an annotation graph; and generating the animation by, for each timeline step included in the first sequence of timeline steps:

automatically generating a first graph that includes a plurality of nodes based on a saved layout that was used to generate the first graph when the timeline step occurred, wherein the plurality of nodes represent a plurality of user actions for annotating data items, rendering the first graph for display in a first interface that resides within a first portion of a display area, and updating one or more additional interfaces to display one or more references and one or more annotations that were displayed in the one or more additional interfaces when the timeline step occurred, wherein the one or more additional interfaces reside within one or more additional portions of the display area.

15. The one or more non-transitory computer-readable storage media of claim 14, wherein receiving the playback command to display the first sequence of timeline steps comprises receiving an indication from a user-selectable button in a playback interface.

16. The one or more non-transitory computer-readable storage media of claim 14, wherein receiving the playback command to display the first sequence of timeline steps comprises receiving an indication of a movement of a marker along a timeline slider, wherein the timeline slider corresponds to the first sequence of timeline steps.

17. The one or more non-transitory computer-readable storage media of claim 14, wherein receiving the playback command to display the first sequence of timeline steps comprises receiving an indication of a selection of a graphical representation of a plurality of timeline steps included in the first sequence of timeline steps.

18. The one or more non-transitory computer-readable storage media of claim 14, wherein updating the one or more additional interfaces comprises:

retrieving a reference from the data set that is associated with the timeline step; and displaying, after rendering the first graph, the reference simultaneously with the first graph.

19. The one or more non-transitory computer-readable storage media of claim 14, wherein updating the one or more additional interfaces comprises:

retrieving a first annotation from an annotation set associated with the data set, wherein the first annotation is associated with the timeline step; and displaying, after rendering the first graph, the first annotation simultaneously with the first graph.

20. The one or more non-transitory computer-readable storage media of claim 19, further comprising instructions that, when executed by the one or more processors, cause the one or more processors to further perform the steps of:

retrieving a reference from the data set that is associated with the timeline step;

displaying, after rendering the first graph, the reference simultaneously with the first graph;

determining a portion of the reference is associated with the first annotation; and highlighting the portion of the reference when displayed.

21. The one or more non-transitory computer-readable storage media of claim 14, further comprising instructions that, when executed by the one or more processors, cause the one or more processors to further perform the steps of:

receiving, after rendering the first graph, a first user action performed to annotate data in the data set; and storing the first user action as a timeline step in a second set of timeline steps that is included in second session data.

22. A system comprising:

one or more memories storing instructions; and one or more processor that are coupled to the one or more memories and, when executing the instructions, are configured to:

receive first session data that includes a set of timeline steps, wherein each timeline step included in the set of timeline steps corresponds to a user action performed to annotate data in a data set, receive a playback command to display an animation of a first sequence of timeline steps included in the set of timeline steps, wherein the first sequence of timeline steps comprises one or more user actions to directly move a node or an edge of an annotation graph, and generate the animation by, for each timeline step included in the first sequence of timeline steps:

automatically generate a first graph that includes a plurality of nodes based on a saved layout that was used to generate the first graph when the timeline step occurred, wherein the plurality of nodes represent a plurality of user actions for annotating data items;

render the first graph for display in a first interface that resides within a first portion of a display area; and update one or more additional interfaces to display one or more references and one or more annotations that were displayed in the one or more additional interfaces when the timeline step occurred, wherein the one or more additional interfaces reside within one or more additional portions of the display area.

23. The system of claim 22, wherein updating the one or more additional interfaces comprises:

retrieving a reference from the data set that is associated with the timeline step; and displaying, after rendering the first graph, the reference simultaneously with the first graph.

* * * * *